US012771974B2

(12) United States Patent
Kaneko et al.

(10) Patent No.: US 12,771,974 B2
(45) Date of Patent: Oct. 20, 2026

(54) OPTICAL COMMUNICATION PATH OPENING METHOD AND MANAGEMENT CONTROL APPARATUS

(71) Applicant: NTT, Inc., Tokyo (JP)

(72) Inventors: Shin Kaneko, Musashino (JP); Naotaka Shibata, Musashino (JP); Takuya Kanai, Musashino (JP); Junichi Kani, Musashino (JP)

(73) Assignee: NTT, Inc., Tokyo (JP)

( * ) Notice: Subject to any disclaimer, the term of this patent is extended or adjusted under 35 U.S.C. 154(b) by 328 days.

(21) Appl. No.: 18/705,678

(22) PCT Filed: Nov. 15, 2021

(86) PCT No.: PCT/JP2021/041838
§ 371 (c)(1),
(2) Date: Apr. 29, 2024

(87) PCT Pub. No.: WO2023/084763
PCT Pub. Date: May 19, 2023

(65) Prior Publication Data
US 2026/0164151 A1 Jun. 11, 2026

(51) Int. Cl.
*H04Q 11/00* (2006.01)

(52) U.S. Cl.
CPC ..... *H04Q 11/0062* (2013.01); *H04Q 11/0005* (2013.01); *H04Q 2011/0016* (2013.01); *H04Q 2011/0086* (2013.01)

(58) Field of Classification Search
CPC ........... H04Q 11/0062; H04Q 11/0005; H04Q 2011/0016; H04Q 2011/0086
See application file for complete search history.

(56) References Cited

U.S. PATENT DOCUMENTS

| | | | | |
|---|---|---|---|---|
| 2003/0072052 A1* | 4/2003 | Graves | H04J 14/0213 | 398/79 |
| 2004/0141757 A1* | 7/2004 | Sato | H04Q 11/0005 | 398/161 |
| 2017/0078771 A1* | 3/2017 | Lingampalli | H04Q 11/0067 | |

OTHER PUBLICATIONS

Takuya Kanai, Kazuaki Honda, Yasunari Tanaka, Shin Kaneko, Kazutaka Hara, Junichi Kani, and Tomoaki Yoshida, "Photonic Gateway for All-Photonics Network", The Institute of Electronics, Information and Communication Engineers General Conference, B-8-20, Mar. 2021.

* cited by examiner

*Primary Examiner* — Casey L Kretzer
(74) *Attorney, Agent, or Firm* — Harness, Dickey & Pierce, P.L.C.

(57) ABSTRACT

Provided is a method for opening an optical communication path, in which one or more optical switches include a plurality of first ports and a plurality of second ports, and a management control device switches connection such that other first ports grouped with a transmission port connected first port of the one or more optical switches connected to a transmission port of the one subscriber device are sequentially connected to one second port to which a response request signal is input, transmits the response request signal to the one second port each time the connection is switched, specifies a reception port connected first port connected to a reception port of the one subscriber device in accordance with reception of a response signal in response to the response request signal, and sets a connection relation between the ports of the one or more optical switches such that an optical signal input to the transmission port connected first port reaches an optical transmission line to which a reception port of another subscriber device serving as a communication partner is connected and an optical (Continued)

signal transmitted from a transmission port of the another subscriber device reaches the reception port connected first port.

8 Claims, 14 Drawing Sheets

OPTICAL COMMUNICATION PATH OPENING METHOD AND MANAGEMENT CONTROL APPARATUS

CROSS-REFERENCE TO RELATED APPLICATIONS

This application is a 371 U.S. National Phase of International Application No. PCT/JP2021/041838, filed Nov. 15, 2021. The entire disclosure of the above application is incorporated herein by reference.

TECHNICAL FIELD

The present invention relates to a method for opening an optical communication path and a management control device.

BACKGROUND ART

In known optical communication systems, a subscriber device needs to open an optical path for connection with a subscriber device serving as a communication partner in order to perform communication. FIGS. 12 and 13 are diagrams for explaining a method for opening an optical path in a known optical communication system 100. As shown in FIG. 12, the known optical communication system 100 includes a plurality of subscriber devices 200-1 to 200-3, a plurality of subscriber devices 300-1 to 300-3, a plurality of control units 400-1 and 400-2, and a plurality of optical SWs 500-1 and 500-2.

In addition, it is assumed that the subscriber device 200-1 is not connected to the optical SW 500-1, the subscriber devices 200-2 and 200-3 are connected to the optical SW 500-1 via an optical transmission line, and the subscriber devices 300-1 to 300-3 are connected to the optical SW 500-2 via an optical transmission line. The optical SW 500-1 and the optical SW 500-2 are connected via an optical communication NW 600 configured of optical transmission lines. The control unit 400-1 performs management of the subscriber devices 200 and controls operations of the optical SW 500-1. The control unit 400-2 performs management of the subscriber devices 300 and controls operations of the optical SW 500-2.

It is assumed that, when a user tries to start communication via the subscriber device 200-1, the subscriber device 200-1 is newly connected to the optical SW 500-1. When the subscriber device 200-1 is initially connected, an optical SW control unit 410 sets connection between ports of the optical SW 500-1 so that the subscriber device 200-1 communicates with a subscriber device management control unit 420. Thus, information required for registration and authentication of the subscriber device 200-1 can be exchanged between the subscriber device 200-1 and the subscriber device management control unit 420, and light emission wavelengths used for transmission and reception can be instructed from the subscriber device management control unit 420 to the subscriber device 200-1. A control signal called an auxiliary management and control channel (AMCC) can be used as a signal for managing and controlling a subscriber device. An AMCC signal includes, for example, state information indicating transmission and reception wavelengths, a transmission light intensity, a temperature, and the like of optical transmission and reception equipment.

When the registration, the authentication, wavelength setting, and the like of the subscriber device 200-1 are completed, the optical SW control unit 410 changes the setting of connection between ports of the optical SW 500-1 so that an optical signal transmitted from the subscriber device 200-1 is transferred to the subscriber device 300 (for example, the subscriber device 300-1) serving as a communication partner. Similarly, the control unit 400-2 changes the setting of connection between ports of the optical SW 500-2 so that an optical signal transmitted from the subscriber device 200-1 is transferred to the subscriber device 300 (for example, the subscriber device 300-1) serving as a communication partner. Thus, as shown in FIG. 13, an optical path connecting the subscriber device 200-1 to the subscriber device 300-1 can be open.

CITATION LIST

Non Patent Literature

[NPL 1] Takuya Kanai, Kazuaki Honda, Yasunari Tanaka, Shin Kaneko, Kazutaka Hara, Junichi Kani, Tomoaki Yoshida, "Photonic Gateway supporting All-Photonics Network," IEICE General Conference, B-8-20, March 2021.

SUMMARY OF INVENTION

Technical Problem

The configuration shown in FIGS. 12 and 13 is a single-core bidirectional transmission configuration in which each subscriber device 200 and the optical SW 500-1 are connected by one optical transmission line, and an upstream optical signal from each subscriber device 200 toward the optical SW 500-1 and a downstream optical signal from the optical SW 500-1 toward the subscriber device 200 are wavelength-multiplexed in one optical transmission line. On the other hand, as shown in FIG. 14, a two-core transmission network configuration in which a subscriber device and an optical SW are connected by two optical transmission lines, and an upstream optical signal and a downstream optical signal are transmitted by different optical transmission lines may be adopted.

For example, this is the case in which a coherent transceiver is used for an optical transceiver for a subscriber device. A coherent transceiver obtains high reception sensitivity by causing local light emission with a high light intensity to interfere with an input optical signal and extracting a beat component as a signal component. By using some of output light from a light source for a transmitted optical signal for local light emission, a local light emission source is not required, and economization of an optical transceiver can be achieved, and thus this optical transceiver configuration can be achieved by many commercial products.

When single-core bidirectional transmission is performed by using a coherent transceiver, a beat component between an upstream optical signal and local light returning to an optical transceiver due to reflection in an optical transmission line becomes a large noise component, and downstream signal reception characteristics deteriorate greatly. For that reason, in the case of using a coherent transceiver, it is necessary to adopt a two-core transmission network configuration.

FIG. 14 is a diagram showing a configuration of an optical communication system 100*a* that performs two-core transmission. As shown in FIG. 14, the optical communication system 100*a* includes a subscriber device 200*a*, a subscriber device 300, a plurality of control units 400-1 and 400-2, and a plurality of optical SWs 500-1 and 500-2. In addition, it is assumed that the subscriber device 200*a* is not connected to the optical SW 500-1, and the subscriber device 300 is connected to the optical SW 500-2 via an optical transmission line.

It is assumed that, when a user tries to start communication via the subscriber device 200*a*, the subscriber device 200*a* is newly connected to the optical SW 500-1. In this case, the control unit 400-1 needs to recognize two ports of the optical SW (for example, the optical SW 500-1) connected to the subscriber device (for example, the subscriber device 200*a*) via an optical transmission line as a pair so that the optical SW 500-1 transfers an optical signal transmitted from the subscriber device 200*a* to the subscriber device 300*a* serving as a communication partner and transfers an optical signal transmitted from subscriber device 300*a* serving as the communication partner to the subscriber device 200*a*.

The control unit 400-2 needs to recognize two ports of the optical SW (for example, the optical SW 500-2) connected to the subscriber device (for example, the subscriber device 300*a*) via the optical transmission line as a pair so that the optical SW 500-2 transfers an optical signal transmitted from the subscriber device 200*a* to the subscriber device 300*a* serving as the communication partner and transfers an optical signal transmitted from the subscriber device 300*a* serving as the communication partner to the subscriber device 200*a*.

The configuration shown in FIG. 14 indicates that a first port 510-1 and a first port 510-2 of the optical SW 500-1 are two ports connected to the subscriber device 200*a* via the optical transmission line, and a second port 520-1 and a second port 520-3 of the optical SW 500-2 are two ports connected to the subscriber device 300*a* via the optical transmission line. Generally, an optical communication network has a network configuration in which, in order to efficiently accommodate a plurality of subscriber devices scattered in an area of a certain size, an optical cable is provided by bundling a plurality of optical transmission lines from a building of a communication service provider to the area, and an optical transmission line used for accommodating a subscriber device in a subscriber's house is drawn from, for example, an electricity pole near the subscriber's house.

In the case of adopting a two-core transmission network configuration, it is necessary to draw two optical transmission lines into the subscriber's house. In this case, it is unknown to which port of the optical SW 500 or the optical SW 600 the two optical transmission lines drawn into the subscriber's house from among the plurality of optical transmission lines bundled into the optical cable are connected. In this case, it is not possible for the control unit (for example, the control unit 400-1) to recognize two ports of the optical SW (for example, the optical SW 500-1) connected via the two optical transmission lines to the newly connected subscriber device (for example, the subscriber device 200*a*) as a pair. As a result, there is a problem that an optical path for communicatively connecting a newly connected subscriber device to a subscriber device serving as a communication partner cannot be opened.

In view of the above-mentioned circumstances, the present invention has an object to provide a technique capable of opening an optical path for communicatively connecting a newly connected subscriber device to a subscriber device serving as a communication partner in an optical communication system that performs two-core transmission.

Solution to Problem

One aspect of the present invention is an optical communication path opening method in an optical communication system that performs two-core transmission in which at least one newly connected subscriber device and one or more optical switches are connected to each other through a plurality of optical transmission lines and an upstream optical signal and a downstream optical signal are transmitted through different optical transmission lines, wherein the one or more optical switches include a plurality of first ports and a plurality of second ports, a management control device switches connection such that other first ports grouped with a transmission port connected first port of the one or more optical switches connected to a transmission port of the one subscriber device are sequentially connected to one second port to which a response request signal is input, the management control device transmits the response request signal to the one second port each time the connection is switched, the management control device specifies a reception port connected first port connected to a reception port of the one subscriber device in accordance with reception of a response signal in response to the response request signal, and the management control device sets a connection relation between the ports of the one or more optical switches such that an optical signal input to the transmission port connected first port reaches an optical transmission line to which a reception port of another subscriber device serving as a communication partner is connected and an optical signal transmitted from a transmission port of the another subscriber device reaches the reception port connected first port.

One aspect of the present invention is a management control device provided in an optical communication system that performs two-core transmission in which at least one newly connected subscriber device and one or more optical switches are connected to each other through a plurality of optical transmission lines and an upstream optical signal and a downstream optical signal are transmitted through different optical transmission lines, the one or more optical switches including a plurality of first ports and a plurality of second ports, the management control device comprising an optical switch control unit configured to switch connection such that other first ports grouped with a transmission port connected first port of the one or more optical switches connected to a transmission port of the one subscriber device are sequentially connected to one second port to which a response request signal is input, and a subscriber device management control unit configured to transmit the response request signal to the one second port each time the connection is switched, wherein the subscriber device management control unit specifies a reception port connected first port connected to a reception port of the one subscriber device in accordance with reception of a response signal in response to the response request signal, and the optical switch control unit sets a connection relation between the ports of the one or more optical switches such that an optical signal input to the transmission port connected first port reaches an optical transmission line to which a reception port of another subscriber device serving as a communication partner is connected and an optical signal transmitted from a transmission port of the another subscriber device reaches the reception port connected first port.

Advantageous Effects of Invention

According to the present invention, in an optical communication system that performs two-core transmission, it is possible to open an optical path for communicatively connecting a newly connected subscriber device to a subscriber device serving as a communication partner.

DESCRIPTION OF EMBODIMENTS

Embodiments of the present invention will be described below with reference to the drawings.

First Embodiment

Figure 1:
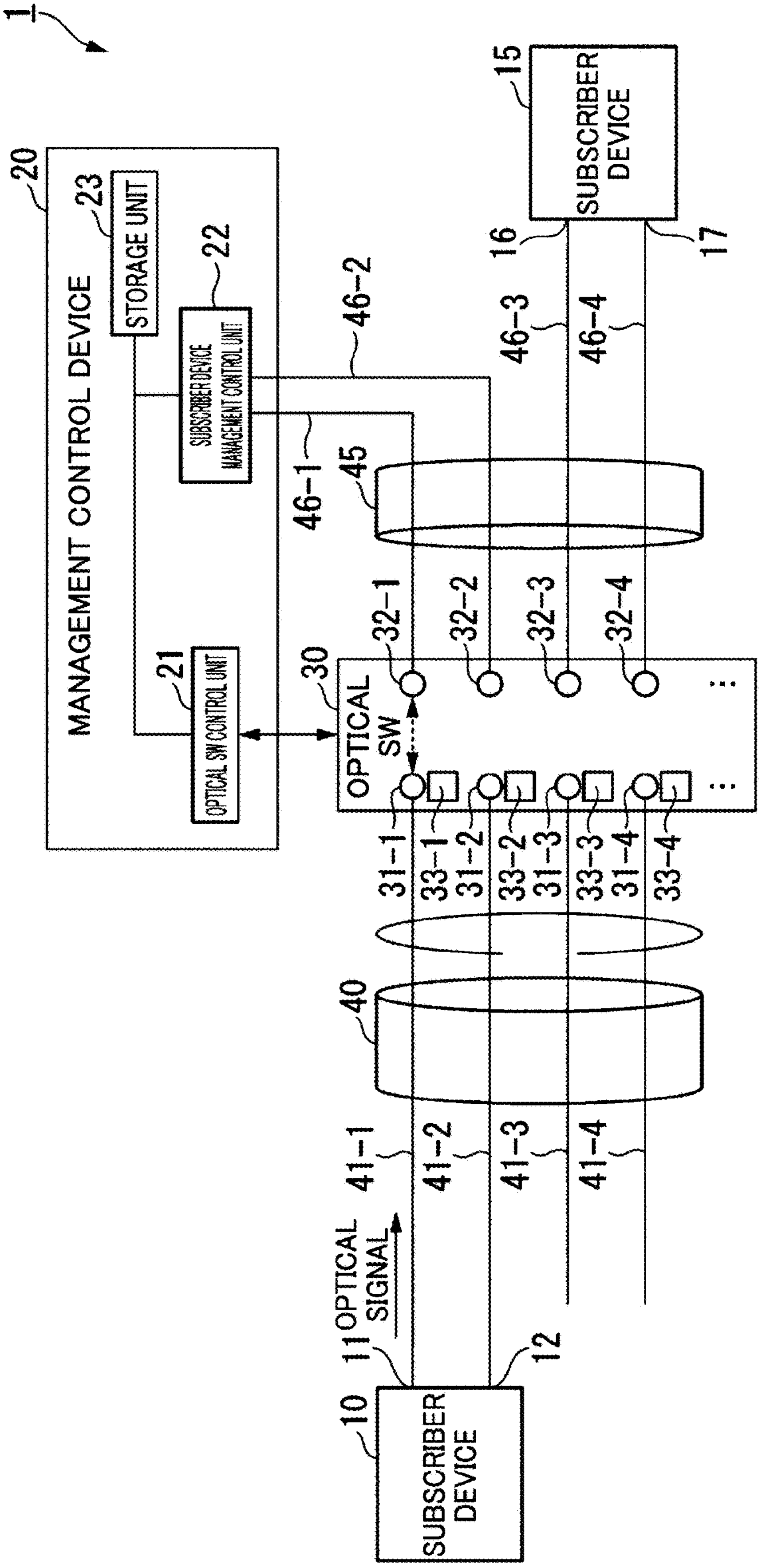
FIG. 1 is a diagram showing a configuration example of an optical communication system according to a first embodiment.

FIG. 1 is a diagram showing a configuration example of an optical communication system 1 according to a first embodiment. The optical communication system 1 includes one or more subscriber devices 10, one or more subscriber devices 15, a management control device 20, and one or more optical SW 30. In the optical communication system 1, it is assumed that two-core transmission is performed using different optical transmission lines for transmission and reception in communication between the subscriber device 10 and the subscriber device 15. The optical transmission line is, for example, an optical fiber.

Figure 12:
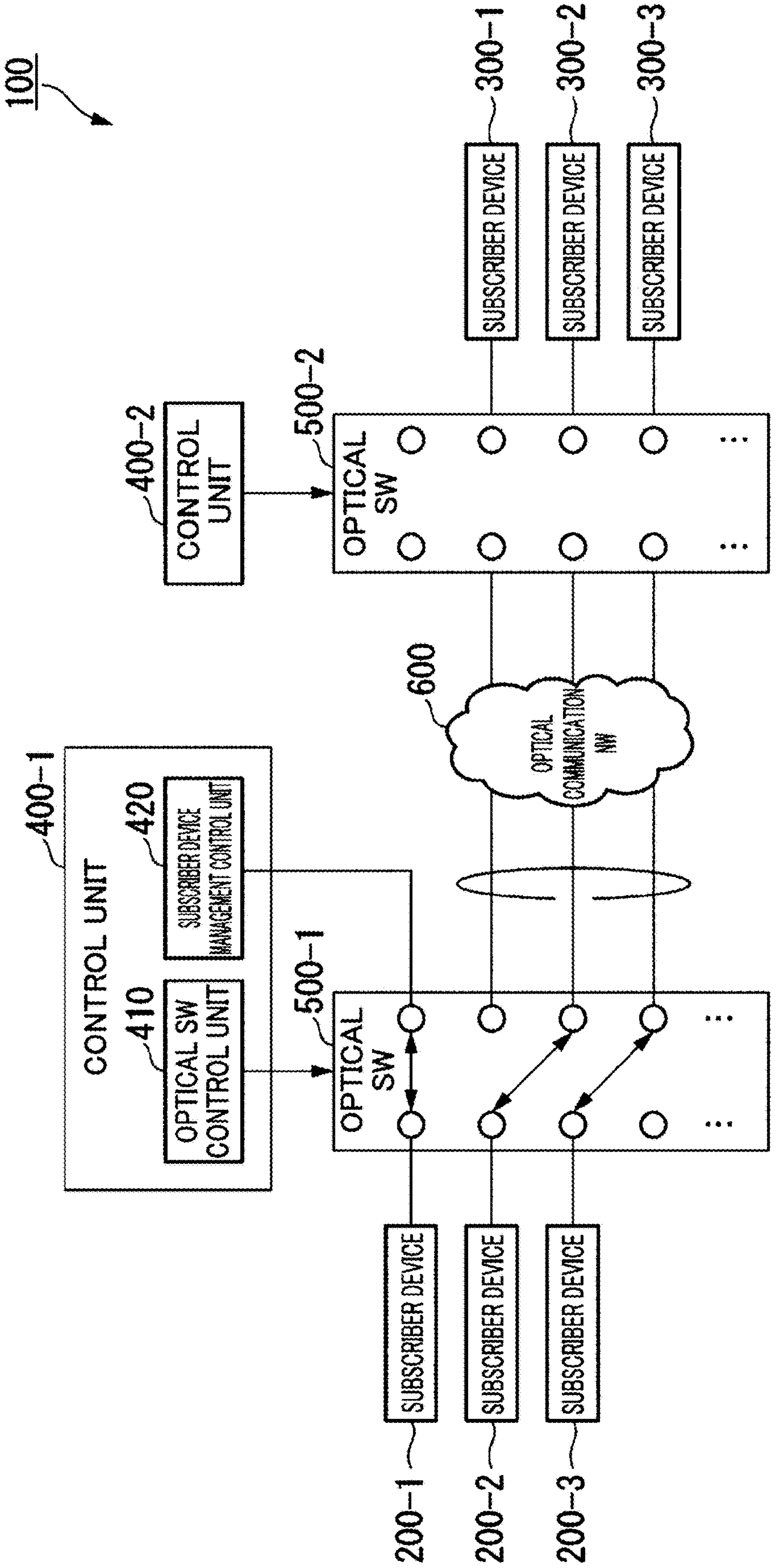
FIG. 12 is a diagram for explaining a method for opening an optical path according to a known optical communication system.
Figure 13:
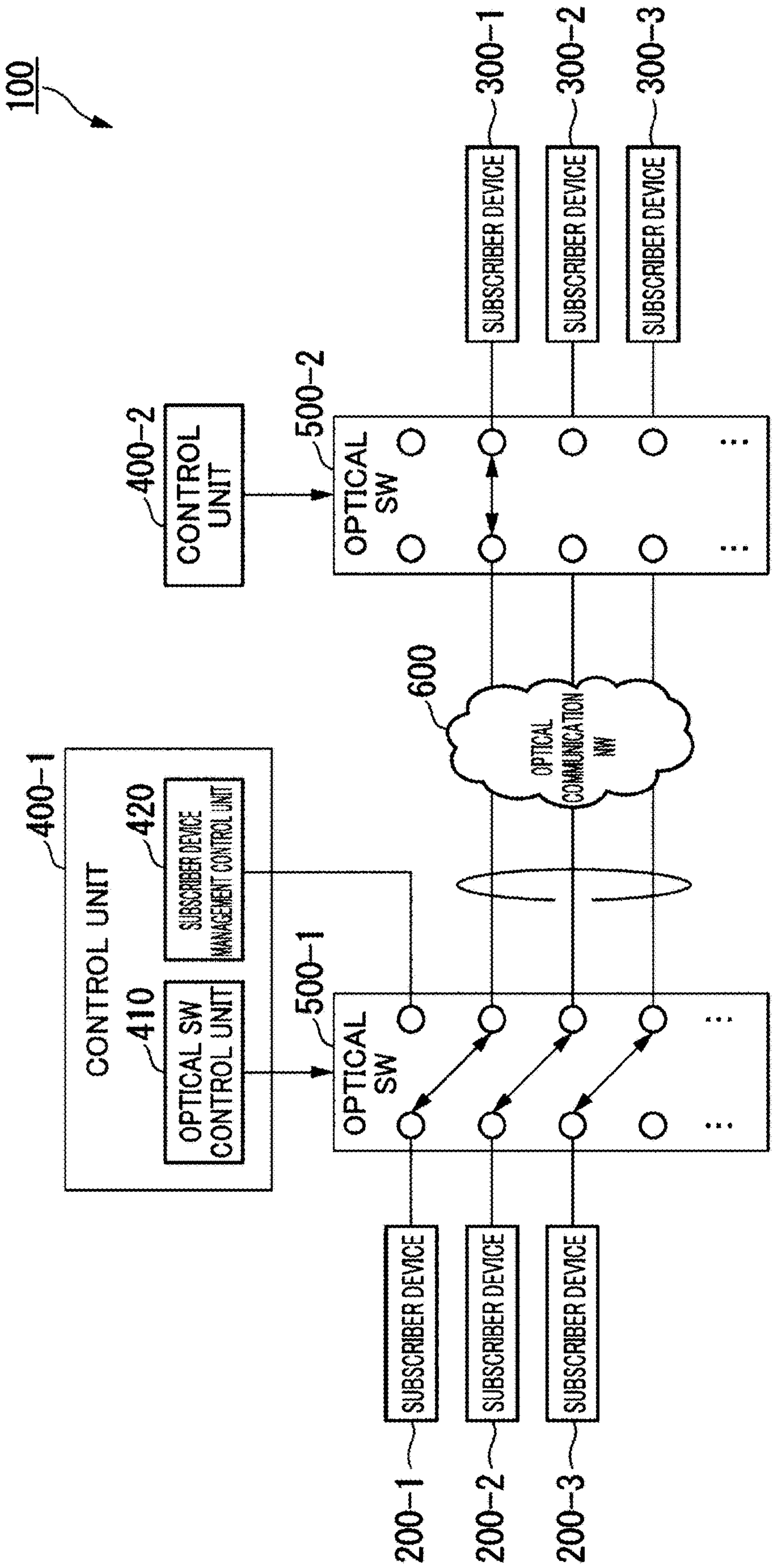
FIG. 13 is a diagram for explaining the method for opening an optical path according to the known optical communication system.
Figure 14:
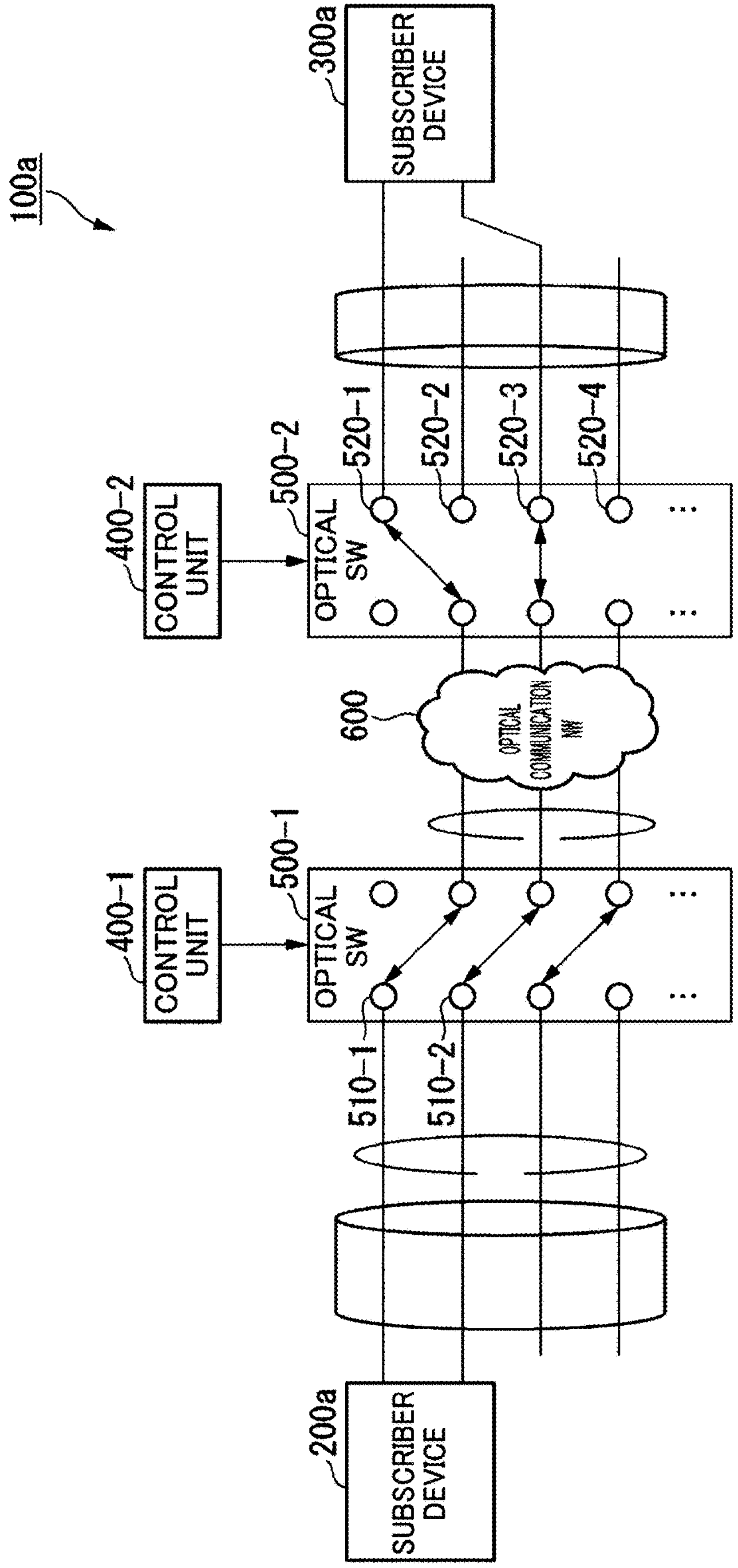
FIG. 14 is a diagram showing a configuration of an optical communication system that performs two-core transmission.

In FIG. 1, the optical communication system 1 shows a configuration in which it includes one subscriber device 10, one subscriber device 15, and one optical SW 30, but a plurality of subscriber devices 10, a plurality of subscriber devices 15, and a plurality of optical SWs 30 may be provided. For example, as in FIG. 12, a new optical SW may be provided between the subscriber device 15 and the optical SW 30.

An optical cable 40 is provided between the subscriber device 10 and the optical SW 30, and an optical cable 45 is provided between the subscriber device 15 and the optical SW 30. The optical cable 40 accommodates a plurality of optical transmission lines 41, and the optical cable 45 accommodates a plurality of optical transmission lines 46. In FIG. 1, as an example, a configuration in which the subscriber device 10 performs communication using two optical transmission lines 41-1 and 41-2 is shown, and a configuration in which the subscriber device 15 performs communication using two optical transmission lines 46-3 and 46-4 is shown. Further, in FIG. 1, as an example, a configuration in which the management control device 20 is connected to the optical SW 30 via two optical transmission lines 46-1 and 46-2 is shown.

The subscriber device 10 includes an optical transceiver. The optical transceiver is, for example, a coherent transceiver. The subscriber device 10 transmits an optical signal through a transmission port 11 and the optical transmission line 41-1 using the optical transceiver and receives an optical signal through the optical transmission line 41-2 and a reception port 12. In the following description, the subscriber device 10 is assumed to be a subscriber device newly connected to the optical SW 30.

The subscriber device 15 is a device that communicates with the subscriber device 10. The subscriber device 15 includes an optical transceiver. The subscriber device 15 receives an optical signal through a reception port 16 using the optical transceiver and transmits an optical signal through a transmission port 17.

The optical SW 30 has M (M is an integer of 2 or more) ports 31, N (N is an integer of 2 or more) ports 32, and M optical detection units 33. In the first embodiment, the description will be made assuming that the number of each of M and N is four. An optical signal input to one port of the optical SW 30 is output from another port. For example, an optical signal input to a port 31 of the optical SW 30 is output from a port 32. The port 31 is one aspect of a first port, and the port 32 is one aspect of a second port.

The optical transmission lines 41 are connected to each port 31 of the optical SW 30. For example, the optical transmission line 41-1 is connected to a port 31-1 of the optical SW 30, and the optical transmission line 41-2 is connected to a port 31-2 of the optical SW 30.

The optical transmission lines 46 are connected to each port 32 of the optical SW 30. For example, the optical transmission line 46-1 is connected to a port 32-1 of the optical SW 30, and the optical transmission line 42-2 is connected to a port 32-2 of the optical SW 30.

An optical detection unit 33-*m* ($1 \le m \le M$) is provided in association with a port 31-*m*. The optical detection unit 33-*m* detects an optical signal input to the port 31-*m*. In a case in which the optical detection unit 33-*m* detects an optical signal, it notifies the management control device 20 of the detection of the optical signal. The notification from the optical detection unit 33-*m* to the management control device 20 may be performed via an electric line connecting the management control device 20 to the optical SW 30.

Also, in FIG. 1, since the subscriber device 10 is a newly connected subscriber device, the optical detection unit 33-*m* is described to be provided only for the port 31-*m* to which the transmission port 11 of the subscriber device 10 is connected, but when another subscriber device (for example, the subscriber device 15) is connected to a port 32-*n* (1≤n≤N), an optical detection unit 33-*n* may also be provided in the port 32-*n*, which is a port to which a transmission port of another subscriber device is connected.

The management control device 20 performs control of at least the subscriber devices 10 and 15 and control of the optical SW 30. Here, the control of the subscriber devices 10 and 15 includes, for example, allocation of light emission wavelengths to the subscriber devices 10 and 15, instructions to stop light, instructions to change wavelengths, and the like. The control of the optical SW 30 includes, for example, switching of connection between ports of the optical SW 30. The management control device 20 includes an optical SW control unit (optical switch controllor) 21, a subscriber device management control unit (subscriber device management controllor) 22, and a storage unit 23.

The optical SW control unit 21 sets and switches connection between ports of the optical SW 30.

In a case in which a subscriber device is newly connected to the optical SW 30, the subscriber device management control unit 22 specifies to which port of the optical SW 30 the subscriber device newly connected to the optical SW 30 is connected and performs optical path opening processing such as wavelength allocation. The management control device 20 includes a transmission port and a reception port for exchanging optical signals via the optical SW 30.

For example, the reception port of the management control device 20 is connected to the optical SW 30 via the optical transmission line 46-1, and the transmission port of the management control device 20 is connected to the optical SW 30 via the optical transmission line 46-2. Functions of the optical SW control unit 21 and the subscriber device management control unit 22 may be realized by one or more processors executing programs.

The storage unit 23 stores subscriber information, grouping information, and optical detection unit installation information. The subscriber information is information about the subscriber devices 10 and 15. The subscriber information includes, for example, information indicating to which port of the optical SW 30 the transmission ports and the reception ports of the subscriber devices 10 and 15 are connected, and information about wavelengths allocated to the subscriber devices 10 and 15. The grouping information is information for identifying ports belonging to the same group. For example, identification information about ports belonging to the same group is collected for each group and included in the grouping information.

In the first embodiment, in the grouping information, it is assumed that grouping the ports 31 (for example, ports 31-1 to 31-4) of the optical SW 30 to which the optical transmission lines 41 accommodated in the optical cable 40 are connected as one group, and grouping the ports 32 (for example, ports 32-1 to 32-4) of the optical SW 30 to which the optical transmission lines 46 accommodated in the optical cable 45 are connected as one group have been determined. The optical detection unit installation information represents information about the ports 31 in which the optical detection units 33-*m* are installed.

As described above, in an optical communication network, in order to efficiently accommodate a plurality of subscriber devices scattered in an area of a certain size, an optical cable that accommodates a plurality of optical transmission lines from a building of a communication service provider to the area is provided. In the first embodiment, a plurality of optical transmission lines accommodated in one optical cable correspond to the grouped optical transmission lines. In addition, each of the plurality of optical transmission lines accommodated in the one optical cable is connected to the ports 31 or the ports 32 of the optical SW 30. For that reason, a manager of the optical communication system may group the ports 31 or the ports 32 of the optical SW 30 to which the grouped optical transmission lines are connected among the plurality of optical transmission lines accommodated in the one optical cable as one group, and store the information in the storage unit 23 as the grouping information.

Figure 2:
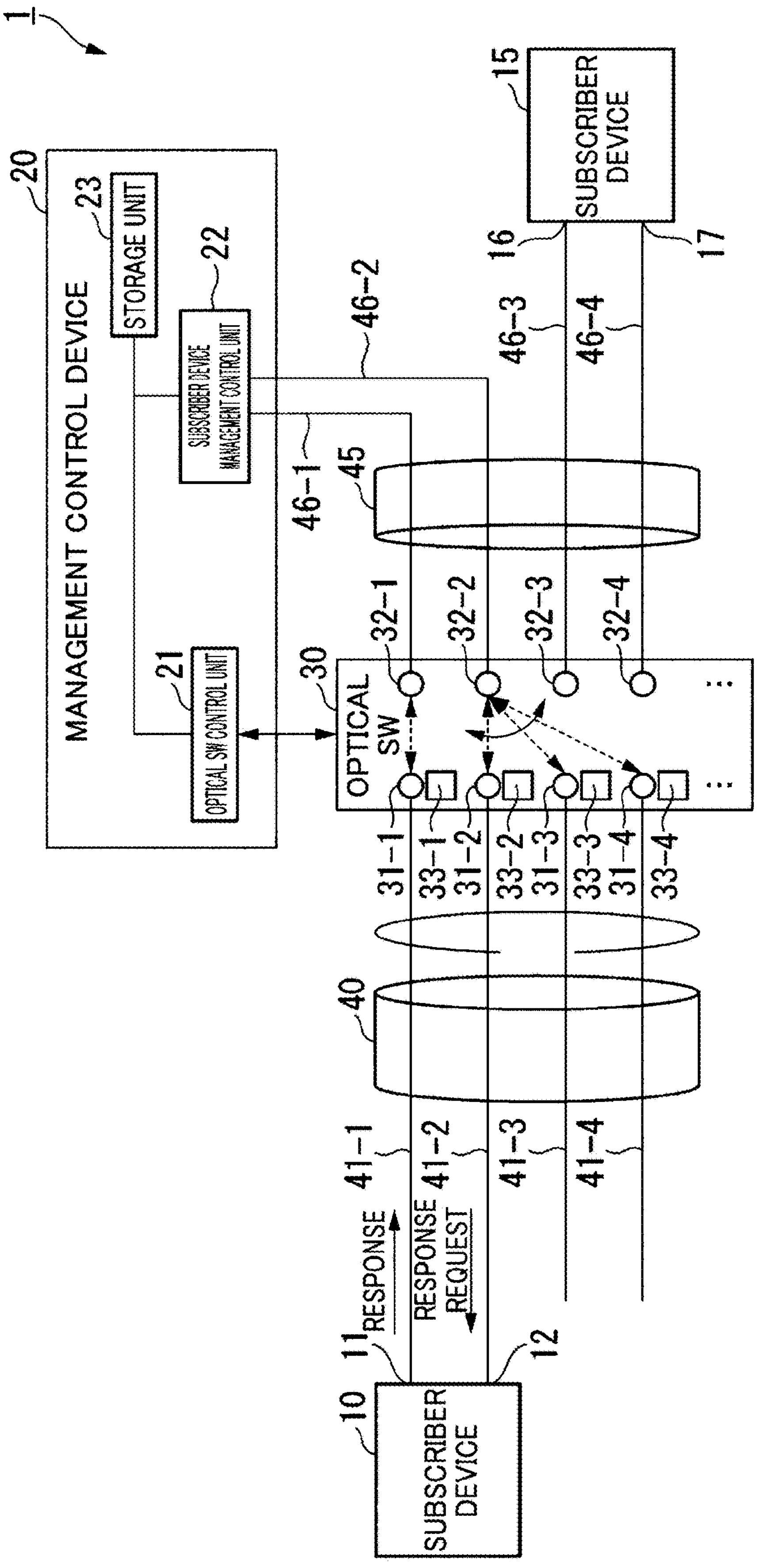
FIG. 2 is a diagram for explaining pairing processing of ports of an optical SW according to the first embodiment.

Next, a method for pairing two ports of the optical SW 30 connected through two optical transmission lines with the newly connected subscriber device (for example, the subscriber device 10) performed by the management control device 20 according to the first embodiment will be described with reference to FIGS. 1 and 2. FIG. 2 is a diagram for explaining pairing processing of ports of the optical SW 30 according to the first embodiment. Here, it is assumed that the transmission port 11 of the subscriber device 10 is connected to the port 31-1 of the optical SW 30 via the optical transmission line 41-1, and the reception port 12 of the subscriber device 10 is connected to the port 31-2 of the optical SW 30 via the optical transmission line 41-2.

The subscriber device 10 transmits an optical signal to the optical SW 30. The optical signal transmitted from the subscriber device 10 is input to the optical SW 30, and thus the optical detection unit 33-1 of the optical SW 30 can detect an input of a new optical signal to the optical SW 30. In this stage, the optical signal may not include data. Then, the light detection unit 33-1 notifies the management control device 20 of the detection result, and thus the management control device 20 can recognize that the port 31-1 associated with the optical detection unit 33-1 that has detected the input of the optical signal is connected to the transmission port 11 of the newly connected subscriber device 10.

The management control device 20 sets a connection relation between the ports 31 and the ports 32 of the optical SW 30 such that the port 31-1 associated with the optical detection unit 33-1 that has detected the input of the optical signal is connected to a reception port of the subscriber device management control unit 22. For example, as shown in FIG. 1, by setting the port 31-1 and the port 32-1 of the optical SW 30 to be connected to each other, the management control device 20 can transmit the optical signal transmitted from the subscriber device 10 to the management control device 20. The processing up to this point is related to the transmission port 11 of the subscriber device 10.

Next, the management control device 20 refers to the grouping information stored in the storage unit 23 and specifies other ports 31 grouped with the port 31-1 associated with the optical detection unit 33-1 that has detected the input of the optical signal. The optical SW control unit 21 of the management control device 20 switches the connection relation between the ports 31 and the ports 32 of the optical SW 30 so that the specified other ports are sequentially connected to the transmission port of the management control device 20. In the example shown in FIG. 2, the other ports 31 grouped with the port 31-1 are the ports 31-2 to 31-4.

Each time the transmission port of the management control device 20 is connected to the other ports 31 via the ports 32, the subscriber device management control unit 22 sends a response request signal via the transmission port and the optical transmission line 46-2. The response request signal is a signal for requesting transmission of a response from the subscriber device 10 that has received the signal.

When the subscriber device 10 receives the response request signal transmitted from the management control device 20, it transmits a response signal from the transmission port 11.

When the management control device 20 receives the response signal within a receivable period of the response signal to the response request signal transmitted to the subscriber device 10 via another port 31-*m*, it can recognize that the reception port 12 of the subscriber device 10 that has transmitted the response signal is connected to the another port 31-*m*. For example, when the management control device 20 receives the response signal within the receivable period of the response signal to the response request signal transmitted to the subscriber device 10 via the port 31-2, it can recognize that the reception port 12 of the subscriber device 10 that has transmitted the response signal is connected to the port 31-2.

Through the above procedure, the management control device 20 can recognize the ports 31 of the optical SW 30 to which the transmission port 11 and the reception port 12 of the newly connected subscriber device 10 are respectively connected. The management control device 20 retains information regarding the combination of the recognized two ports 31 of the optical SW 30. In this way, the description of the method for pairing two ports of the optical SW 30 connected by two optical transmission lines with the newly connected subscriber device (for example, the subscriber device 10) performed by the management control device 20 is finished.

Figure 3:
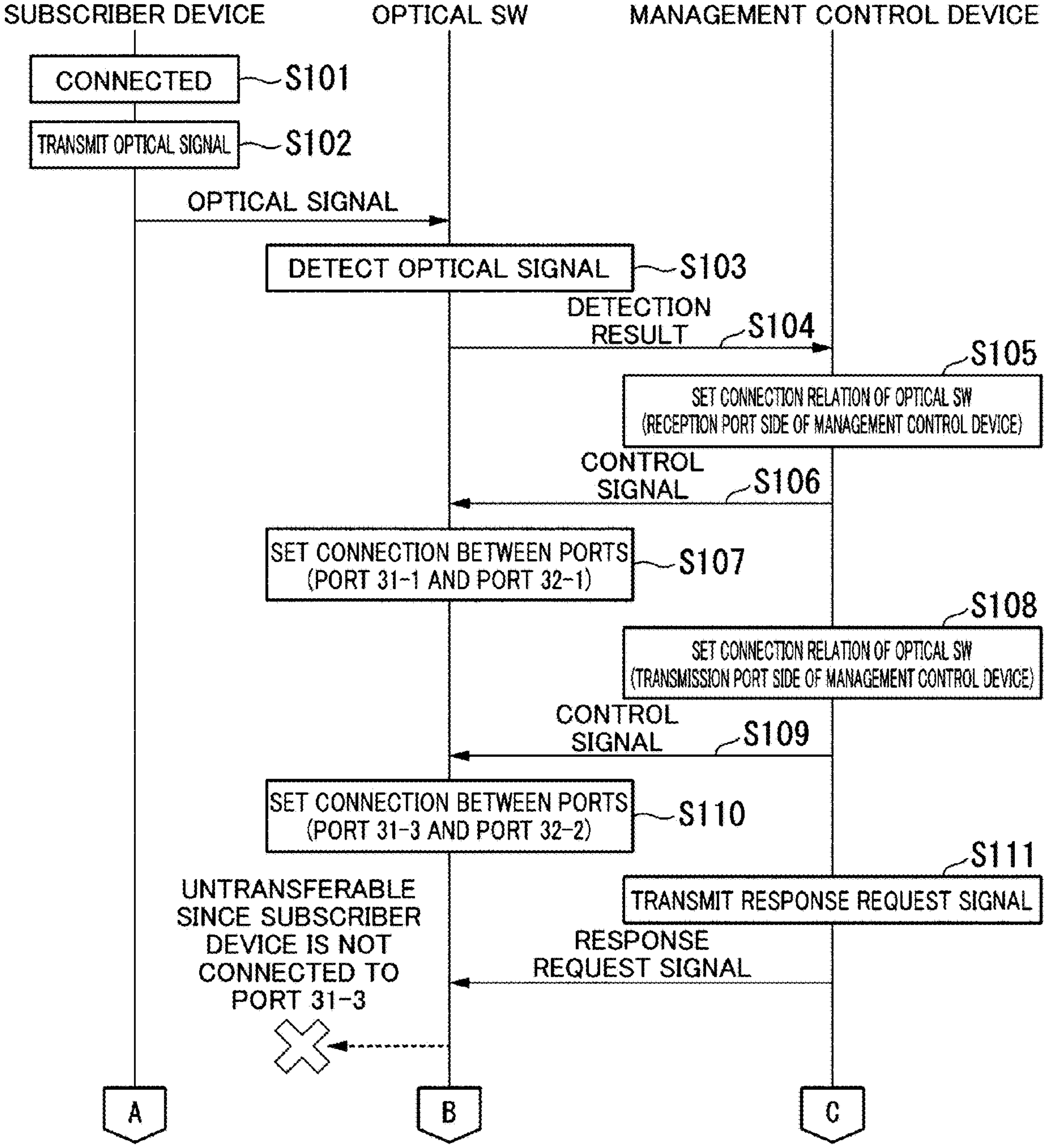
FIG. 3 is a sequence diagram showing a flow of processing of the optical communication system according to the first embodiment.
Figure 4:
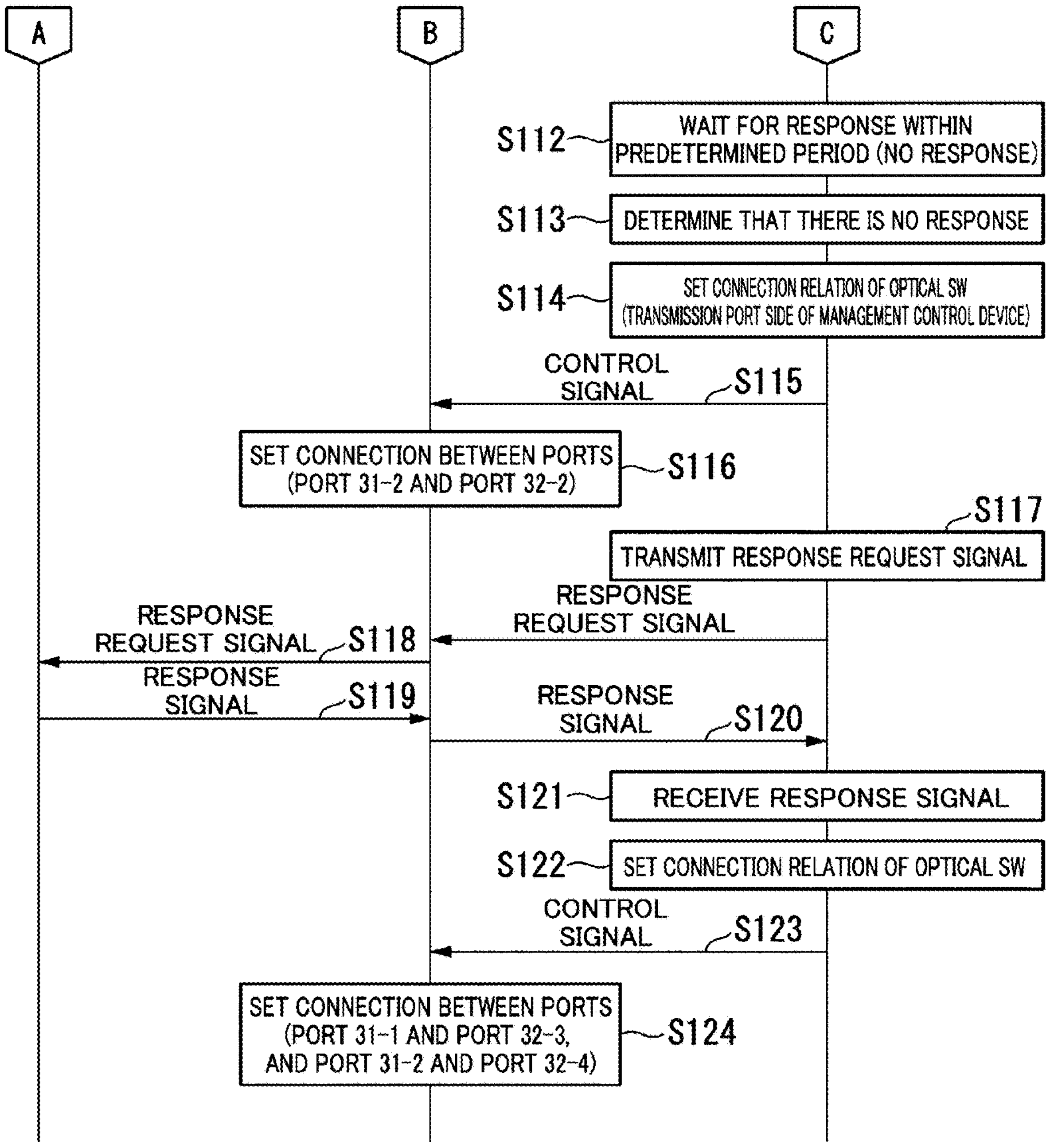
FIG. 4 is a sequence diagram showing the flow of processing of the optical communication system according to the first embodiment.

FIGS. 3 and 4 are sequence diagrams showing a flow of processing of the optical communication system 1 according to the first embodiment. It is assumed that the subscriber device 10 is not connected to the optical SW 30 when the processing of FIGS. 3 and 4 is started.

It is assumed that a user connects the transmission port 11 of the subscriber device 10 to the optical transmission line 41-1 and connects the reception port 12 of the subscriber device 10 to the optical transmission line 41-2. Thus, the subscriber device 10 is connected to the optical SW 30 via the optical transmission lines 41 (step S101). The subscriber device 10 transmits an optical signal from the transmission port 11 to the optical transmission line 41-1 (step S102). The optical signal transmitted from the subscriber device 10 is input to the port 31-1 of the optical SW 30 via the optical transmission line 41-1.

The optical detection unit 33-1 of the optical SW 30 detects the optical signal input to the port 31-1 (step S103). The optical detection unit 33-1 transmits the detection result, which indicates that the optical signal has been detected, to the management control device 20 (step S104). The optical SW control unit 21 of the management control device 20 acquires the detection result transmitted from the optical detection unit 33-1. The optical SW control unit 21 refers to the optical detection unit installation information stored in the storage unit 23 and specifies a port 31 (for example, the port 31-1) in which the optical detection unit 33-1 that has notified the detection result is installed. Thus, the optical SW control unit 21 recognizes that the transmission port 11 of the subscriber device 10 is connected to the port 31-1 of the optical SW 30.

The optical SW control unit 21 sets the connection relation between the ports of the optical SW 30 (step S105). Specifically, the optical SW control unit 21 sets the connection relation of the optical SW 30 to connect the port 31-1 to which the transmission port 11 of the subscriber device 10 is connected to the port 32-1 to which the reception port of the management control device 20 is connected. The optical SW control unit 21 generates a control signal for connecting the port 31-1 to the port 32-1. The optical SW control unit 21 transmits the generated control signal to the optical SW 30 (step S106).

The optical SW 30 sets the connection relation between the ports on the basis of the control signal transmitted from the management control device 20 (step S107). Thus, the port 31-1 and the port 32-1 of the optical SW 30 are connected to each other. As a result, the optical signal transmitted from the subscriber device 10 is transmitted to the reception port of the management control device 20.

Next, the optical SW control unit 21 refers to the grouping information stored in the storage unit 23 and specifies other ports 31 grouped with the port 31-1 to which the optical signal is input. For example, the optical SW control unit 21 specifies the ports 31-2 to 31-4 as the other ports 31. The optical SW control unit 21 selects one port 31 among the specified ports 31-2 to 31-4. For example, the optical SW control unit 21 selects the port 31-3. Also, the order in which the optical SW control unit 21 selects the ports 31 may be any order.

The optical SW control unit 21 sets the connection relation between the ports of the optical SW 30 on the basis of the selected port 31-3 (step S108). Specifically, the optical SW control unit 21 sets the connection relation of the optical SW 30 to connect the selected port 31-3 to the port 32-2 to which the transmission port of the management control device 20 is connected. The optical SW control unit 21 generates a control signal for connecting the port 31-3 to the port 32-2. The optical SW control unit 21 transmits the generated control signal to the optical SW 30 (step S109).

The optical SW 30 sets the connection relation between the ports on the basis of the control signal transmitted from the management control device 20 (step S110). Thus, the port 31-3 and the port 32-2 of the optical SW 30 are connected to each other. The subscriber device management control unit 22 generates a response request signal when the connection between the port 32-2 to which the management control device 20 is connected and any one port 31 is completed. The subscriber device management control unit 22 transmits the generated response request signal via the transmission port and the optical transmission line 46-2 (step S111).

The response request signal transmitted from the management control device 20 is input to the port 32-2 of the optical SW 30. The response request signal input to the port 32-2 is output from the port 31-3 connected to the port 32-2 by the optical SW 30. However, since the subscriber device 10 is not connected to the port 31-3, the response request signal output from the port 31-3 is not transferred to the subscriber device 10.

The subscriber device management control unit 22 waits for a response for a predetermined period from the time when the response request signal is transmitted (step S112). The subscriber device management control unit 22 executes processing of step S121 when the response to the response request signal is obtained within the predetermined period and executes processing of step S113 when no response to the response request signal is obtained within the predetermined period. Here, it is assumed that no response is obtained. The subscriber device management control unit 22 determines that there is no response to the response request signal (step S113).

When the response to the response request signal is not obtained, the subscriber device management control unit 22 notifies the optical SW control unit 21 of the fact that no response is obtained. When the notification that no response is obtained is obtained from the subscriber device management control unit 22, the optical SW control unit 21 again sets the connection relation between the ports of the optical SW 30 (step S114). In this case, the optical SW control unit 21 selects one port 31 except the already selected port 31 among the ports 31-2 to 31-4 specified by the processing of the step S108. For example, the optical SW control unit 21 selects the port 31-2.

The optical SW control unit 21 sets the connection relation of the optical SW 30 to connect the selected port 31-2 to the port 32-2 to which the transmission port of the management control device 20 is connected. The optical SW control unit 21 generates a control signal for connecting the port 31-2 and the port 32-2. The optical SW control unit 21 transmits the generated control signal to the optical SW 30 (step S115).

The optical SW 30 sets the connection relation between the ports on the basis of the control signal transmitted from the management control device 20 (step S116). Thus, the port 31-2 and the port 32-2 of the optical SW 30 are connected to each other. The subscriber device management control unit 22 generates a response request signal when the connection between the port 32-2 to which the transmission port of the management control device 20 is connected and any one port 31 is completed. The subscriber device management control unit 22 transmits the generated response request signal via the transmission port and the optical transmission line 46-2 (step S117). The subscriber device management control unit 22 waits for a response for a prescribed period from the time when the response request signal is transmitted, similarly to the processing of the step S112.

The response request signal transmitted from the management control device 20 is input to the port 32-2 of the optical SW 30. The response request signal input to the port 32-2 is output from the port 31-2 connected to the port 32-2 by the optical SW 30. Since the subscriber device 10 is connected to the port 31-2 via the optical transmission line 41-2, the response request signal output from the port 31-2 is transferred to the subscriber device 10 via the optical transmission line 41-2 (step S118).

The subscriber device 10 receives the response request signal transmitted from the management control device 20 at the reception port 12. The subscriber device 10 generates a response signal in accordance with the reception of the response request signal. The subscriber device 10 transmits the generated response signal from the transmission port 11 to the optical transmission line 41-1 (step S119). The response signal transmitted from the subscriber device 10 is input to the port 31-1 of the optical SW 30 via the optical transmission line 41-1.

Since the port 31-1 of the optical SW 30 is connected to the port 32-1, the response signal input to the port 31-1 is output from the port 32-1 (step S120). The response signal output from the port 32-1 is received at the reception port of the management control device 20 via the optical transmission line 46-1 (step S121).

By receiving the response signal within a predetermined period, the subscriber device management control unit 22 recognizes that the reception port 12 of the subscriber device 10 is connected to the port 31-2 of the optical SW 30. The subscriber device management control unit 22 associates information about the port 31-1 of the optical SW 30 to which the transmission port 11 of the subscriber device 10 is connected with information about the port 31-2 of the optical SW 30 to which the reception port 12 of the subscriber device 10 is connected, and stores them in the storage unit 23. This information is stored as the subscriber information. After that, the subscriber device management control unit 22 allocates wavelengths used for transmission and reception to the subscriber device 10.

The optical SW control unit 21 refers to the subscriber information and sets the connection relation between the ports of the optical SW 30 (step S122). Specifically, the optical SW control unit 21 sets the connection relation between the ports of the optical SW 30 such that the optical signal input to the port 31-1 connected to the transmission port 11 of the subscriber device 10 reaches the port 32-3 of the optical SW 30 connected to the reception port 16 of the subscriber device 15 serving as the communication partner, and the optical signal input to the port 32-4 of the optical SW 30 connected to the transmission port 17 of the subscriber device 15 reaches the port 31-2 of the optical SW 30 connected to the reception port 12 of the subscriber device 10.

The optical SW control unit 21 generates a control signal for connecting the port 31-1 to the port 32-3 and connecting the port 31-2 to the port 32-4. The optical SW control unit 21 transmits the generated control signal to the optical SW 30 (step S123). The optical SW 30 sets the connection relation between the ports as shown in FIG. 5 on the basis of the control signal transmitted from the management control device 20 (step S124).

Figure 5:
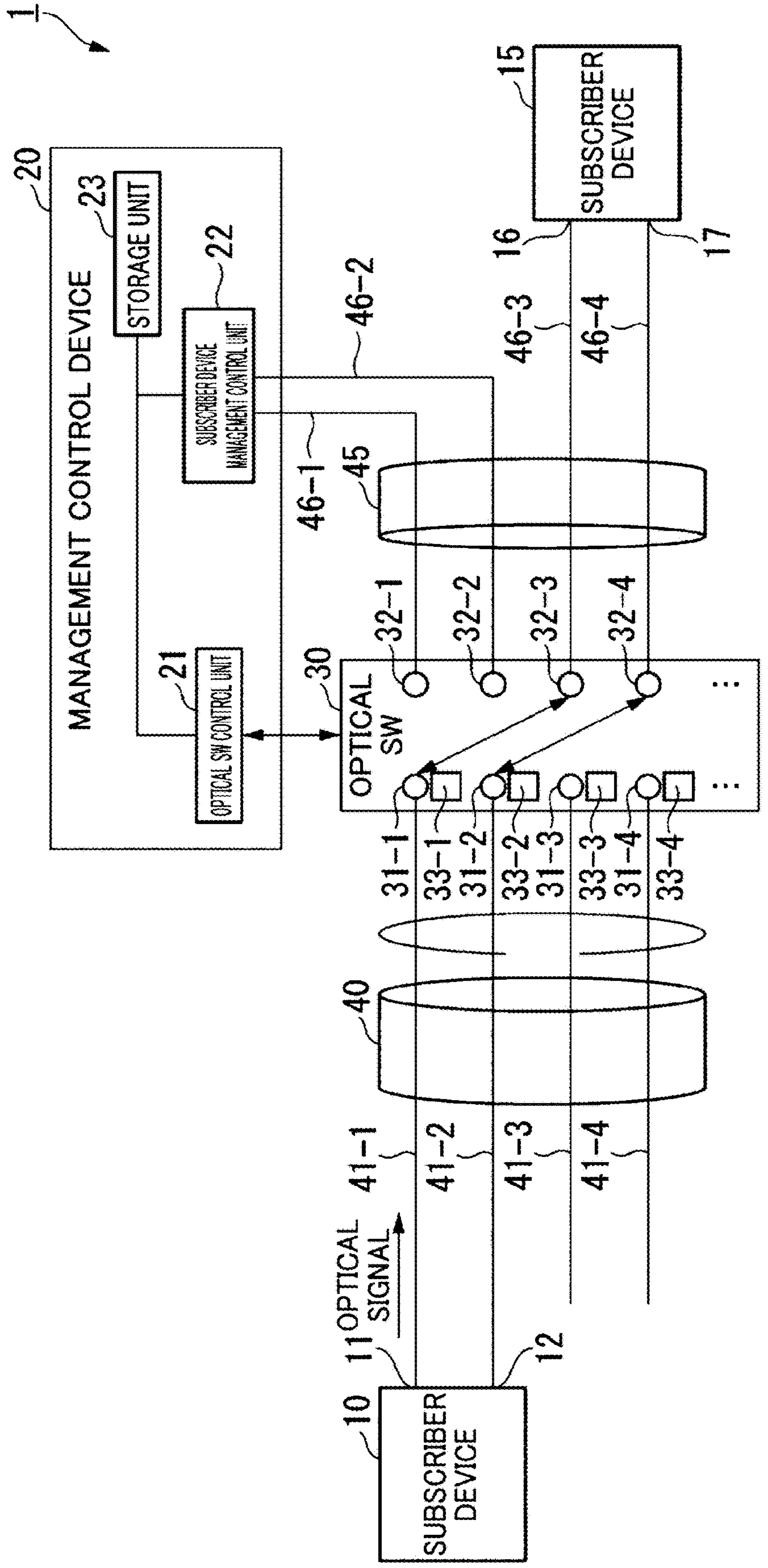
FIG. 5 is a diagram showing a state in which subscriber devices are communicatively connected to each other in the first embodiment.

FIG. 5 is a diagram showing a state in which the subscriber device 10 and the subscriber device 15 are communicatively connected to each other. Through the processing of step S124, as shown in FIG. 5, the port 31-1 and the port 32-3 of the optical SW 30 are connected to each other, and the port 31-2 and the port 32-4 are connected to each other. As a result, communication between the subscriber device 10 and the subscriber device 15 becomes possible.

According to the optical communication system 1 configured as described above, in an optical communication system that performs two-core transmission, it is possible to open an optical path for communicatively connecting a newly connected subscriber device to a subscriber device serving as a communication partner. Specifically, in the optical communication system 1, the management control device 20 switches connection such that other ports 31 grouped with the port 31-1 of the optical SW 30 connected to the transmission port 11 of the newly connected subscriber device 10 are sequentially connected to the port 32 to which the response request signal is input. Further, the management control device 20 transmits the response request signal to the second port each time the connection is switched and specifies the port 31-2 connected to the reception port 12 of the subscriber device 10 in accordance with the reception of the response signal to the response request signal. Then, the management control device 20 sets the connection relation between the ports of the optical SW 30 such that the optical signal input to the port 31-1 reaches the optical transmission line (for example, the optical transmission line 46-3) to which the reception port 16 of the subscriber device 15 serving as the communication partner is connected, and the optical signal transmitted from the transmission port 17 of the subscriber device 15 reaches the port 31-2 connected to the reception port 12 of the subscriber device 10. Thus, in an optical communication system that performs two-core transmission, it is possible to open an optical path for communicatively connecting a newly connected subscriber device to a subscriber device serving as a communication partner.

Further, in the optical communication system 1, the optical switch 30 having the port 31-1 of the optical SW 30 connected to the transmission port 11 of the newly connected subscriber device 10 is provided with the optical detection unit 33 in association with the port 31 of the optical SW 30. The management control device 20 can specify which port 31 of the optical SW 30 is connected to the transmission port 11 of the subscriber device 10 on the basis of the detection result of the optical detection unit 33.

Second Embodiment

In a second embodiment, a configuration in which a plurality of optical SWs are provided, a transmission port and a reception port of a newly connected subscriber device are connected to different optical SWs, and optical transmission lines accommodated in the same optical cable are connected to the plurality of optical SWs will be described.

Figure 6:
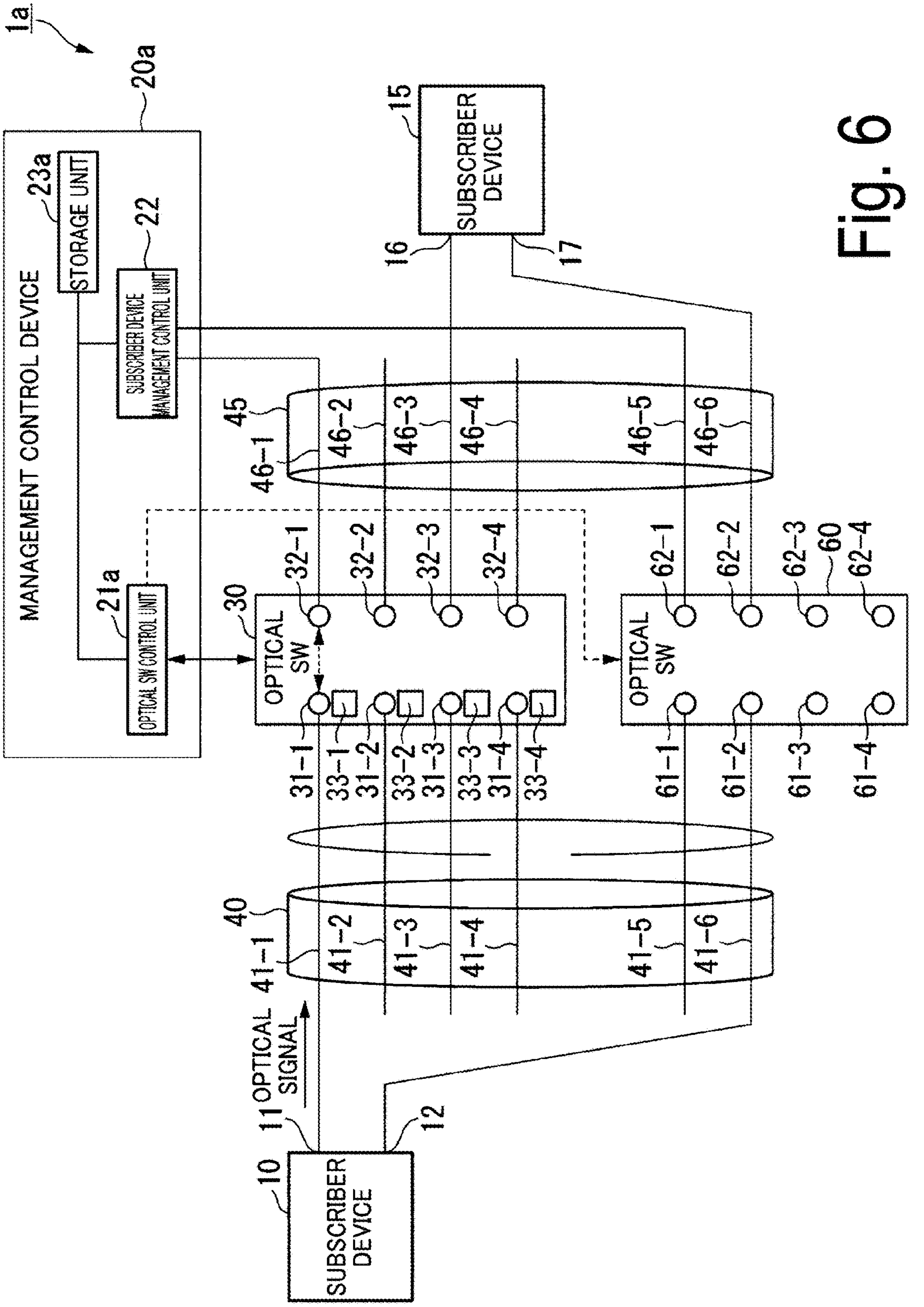
FIG. 6 is a diagram showing a configuration example of an optical communication system according to a second embodiment.

FIG. 6 is a diagram showing a configuration example of an optical communication system 1*a* according to the second embodiment. The optical communication system 1*a* includes the one or more subscriber devices 10, the one or more subscriber devices 15, a management control device 20*a*, the optical SW 30, and an optical SW 60. The optical communication system 1*a* is different from the configuration shown in FIG. 1 in that the transmission port 11 and the reception port 12 of the subscriber device 10 are connected to different optical SWs, the reception port 16 and the transmission port 17 of the subscriber device 15 are connected to different optical SWs, and a transmission port and a reception port of the management control device 20*a* are connected to different optical SWs, and a pairing method is basically the same as the method described above.

The optical cable 40 is provided between the subscriber device 10 and the optical SW 30 and between the subscriber device 10 and the optical SW 60, and the optical cable 45 is provided between the subscriber device 15 and the optical SW 30 and between the subscriber device 15 and the optical SW 60. The optical cable 40 accommodates the plurality of optical transmission lines 41, and the optical cable 45 accommodates the plurality of optical transmission lines 46. In this way, in the second embodiment, the optical transmission lines accommodated in the same optical cable 40 or the same optical cable 45 are connected to the optical SW 30 and the optical SW 60.

The optical SW 60 has P (Pis an integer of 2 or more) ports 61 and Q (Q is an integer of 2 or more) ports 62. In the example shown in FIG. 6, the description will be made assuming that the number of each of P and Q is four. An optical signal input to a certain port of the optical SW 60 is output from another port. For example, an optical signal input to a port 61 of the optical SW 60 is output from a port 62. The port 61 is one aspect of a first port, and the port 62 is one aspect of a second port.

In FIG. 6, the following connection relation is shown as an example. The transmission port 11 of the subscriber device 10 is connected to the port 31-1 of the optical SW 30 via the optical transmission line 41-1, and the reception port 12 of the subscriber device 10 is connected to a port 61-2 of the optical SW 60 via an optical transmission line 41-6. For example, the reception port 16 of the subscriber device 15 is connected to the port 32-3 of the optical SW 30 via the optical transmission line 46-3, and the transmission port 17 of the subscriber device 15 is connected to a port 62-2 of the optical SW 60 via an optical transmission line 46-6. For example, the transmission port of the management control device 20 is connected to the port 32-1 of the optical SW 30 via the optical transmission line 46-1, and the reception port of the management control device 20 is connected to a port 62-1 of the optical SW 60 via an optical transmission line 46-5.

Also, in FIG. 6, since the subscriber device 10 is the newly connected subscriber device, a configuration in which the optical detection unit 33-*m* is provided only for the port 31-*m* of the optical SW 30, which is a port to which the transmission port 11 of the subscriber device 10 is connected is shown, but when the port to which the transmission port 11 of the subscriber device 10 is connected is connected to a port 61-*p* ($1 \leq p \leq P$) of the optical SW 60, an optical detection unit 33-*p* may also be provided in the port 61-*p* of the optical SW 60, which is the port to which the transmission port 11 of the subscriber device 10 is connected.

The management control device 20*a* includes an optical SW control unit 21*a*, the subscriber device management control unit 22, and a storage unit 23*a*. The optical SW control unit 21*a* sets and switches connection between ports of the optical SWs 30 and 60.

The storage unit 23*a* stores subscriber information, grouping information, and optical detection unit installation information. In the second embodiment, in the grouping information, it is assumed that grouping the ports 31 (for example, the ports 31-1 to 31-4) of the optical SW 30 to which the optical transmission lines 41 accommodated in the optical cable 40 are connected and the ports 61 (for example, the ports 61-1 and 61-2) of the optical SW 60 as one group, and grouping the ports 32 (for example, the ports 32-1 to 32-4) of the optical SW 30 to which the optical transmission lines 46 accommodated in the optical cable 45 are connected and the ports 62 (for example, the ports 62-1 and 62-2) of the optical SW 60 as one group have been determined.

In this way, in the second embodiment, even when some of the optical transmission lines accommodated in the same optical cable are connected to ports of different optical SWs, they can be classified into the same group in accordance with setting of the grouping information. Also, when optical transmission lines not accommodated in the optical cable 40 are connected to the ports 61 of the optical SW 60, the ports 61 to which the optical transmission lines not accommodated in the optical cable 40 are connected becomes a different group.

Figure 7:
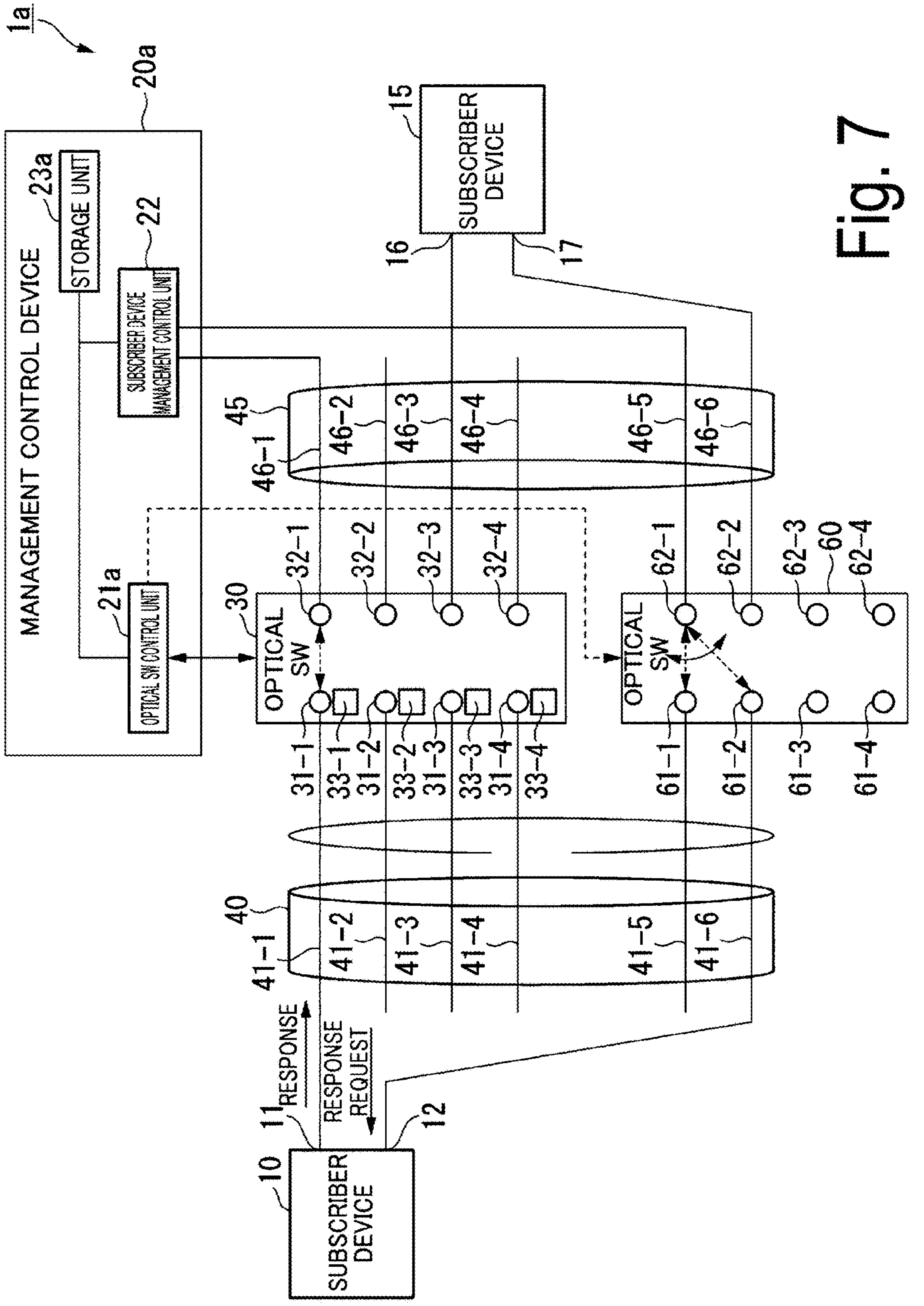
FIG. 7 is a diagram for explaining pairing processing of each port of each optical SW according to the second embodiment.

Next, a method for pairing the ports of the optical SW 30 and the optical SW 60 connected to the newly connected subscriber device (for example, the subscriber device 10) via the optical transmission lines performed by the management control device 20*a* according to the second embodiment will be described with reference to FIGS. 6 and 7. In addition, in FIGS. 6 and 7, different points from the first Embodiment will be described. FIG. 7 is a diagram for explaining pairing processing of each port of the optical SW 30 and the optical SW 60 according to the second embodiment. Here, it is assumed that the transmission port 11 of the subscriber device 10 is connected to the port 31-1 of the optical SW 30 via the optical transmission line 41-1, and the reception port 12 of the subscriber device 10 is connected to the port 61-2 of the optical SW 60 via the optical transmission line 41-6.

Since the processing related to the transmission port 11 of the subscriber device 10 is the same as in the first embodiment, the description thereof will be omitted. The management control device 20*a* refers to the grouping information stored in the storage unit 23*a* and specifies other ports grouped with the port 31-1 associated with the optical detection unit 33-1 that has detected the input of the optical signal. The optical SW control unit 21*a* of the management control device 20*a* switches connection relation between the ports 61 of the optical SW 60 and the ports 62 of the optical SW 60 so that the specified other ports are sequentially connected to the transmission port of the management control device 20*a*.

In the example shown in FIG. 7, the other ports grouped with the port 31-1 are the ports 31-2 to 31-4 of the optical SW 30 and the ports 61-1 and 61-2 of the optical SW 60. However, since the transmission port of the management control device 20*a* is connected to the port 62-1 of the optical SW 60, there is no need to switch the connection relation of the optical SW 30. Then, the management control device 20*a* switches the connection relation between the ports 61 of the optical SW 60 and the ports 62 of the optical SW 60 to be sequentially connected to the transmission port of the management control device 20*a*.

Each time the transmission port of the management control device 20*a* is connected to the other ports 61 via the ports 62, the subscriber device management control unit 22 sends a response request signal via the transmission port and the optical transmission line 46-5. When the management control device 20*a* receives a response signal within a receivable period of the response signal to the response request signal transmitted to the subscriber device 10 via the port 61-*p* of the optical SW 60, the management control device 20*a* can recognize that the reception port 12 of the subscriber device 10 that has transmitted the response signal is connected to the port 61-*p* of the optical SW 60. For example, when the management control device 20*a* receives the response signal within the receivable period of the response signal to the response request signal transmitted to the subscriber device 10 via the port 61-2 of the optical SW 60, the management control device 20*a* can recognize that the reception port 12 of the subscriber device 10 that has transmitted the response signal is connected to the port 61-2 of the optical SW 60.

Through the above procedure, the management control device 20*a* can recognize the port 31 of the optical SW 30 to which the transmission port 11 of the newly connected subscriber device 10 is connected and the port 61 of the optical SW 60 to which the reception port 12 of the subscriber device 10 is connected. The management control device 20*a* retains information regarding the combination of the port 31 of the optical SW 30 and the port 61 of the optical SW 60 that have been recognized.

Figure 8:
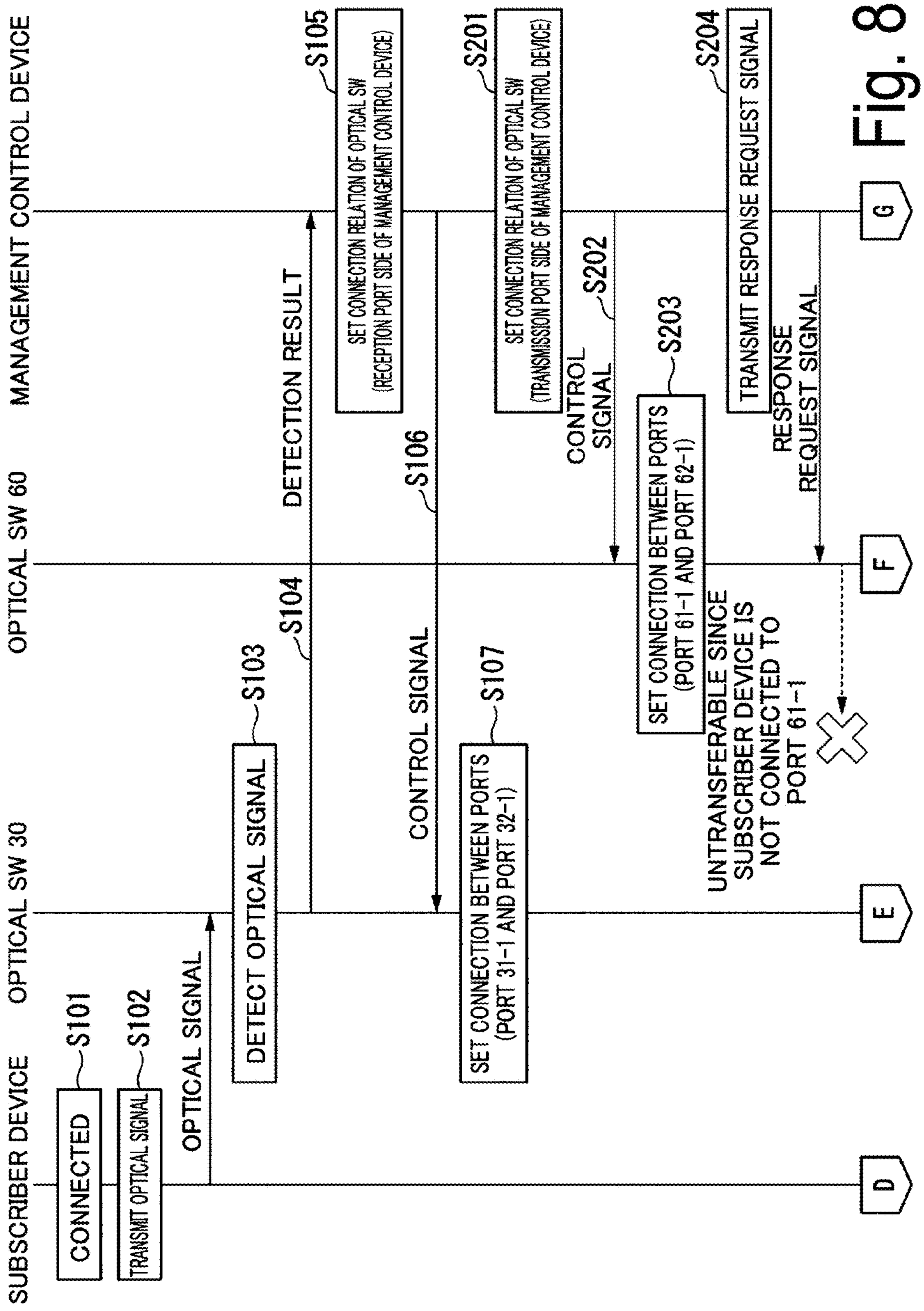
FIG. 8 is a sequence diagram showing a flow of processing of the optical communication system according to the second embodiment.
Figure 9:
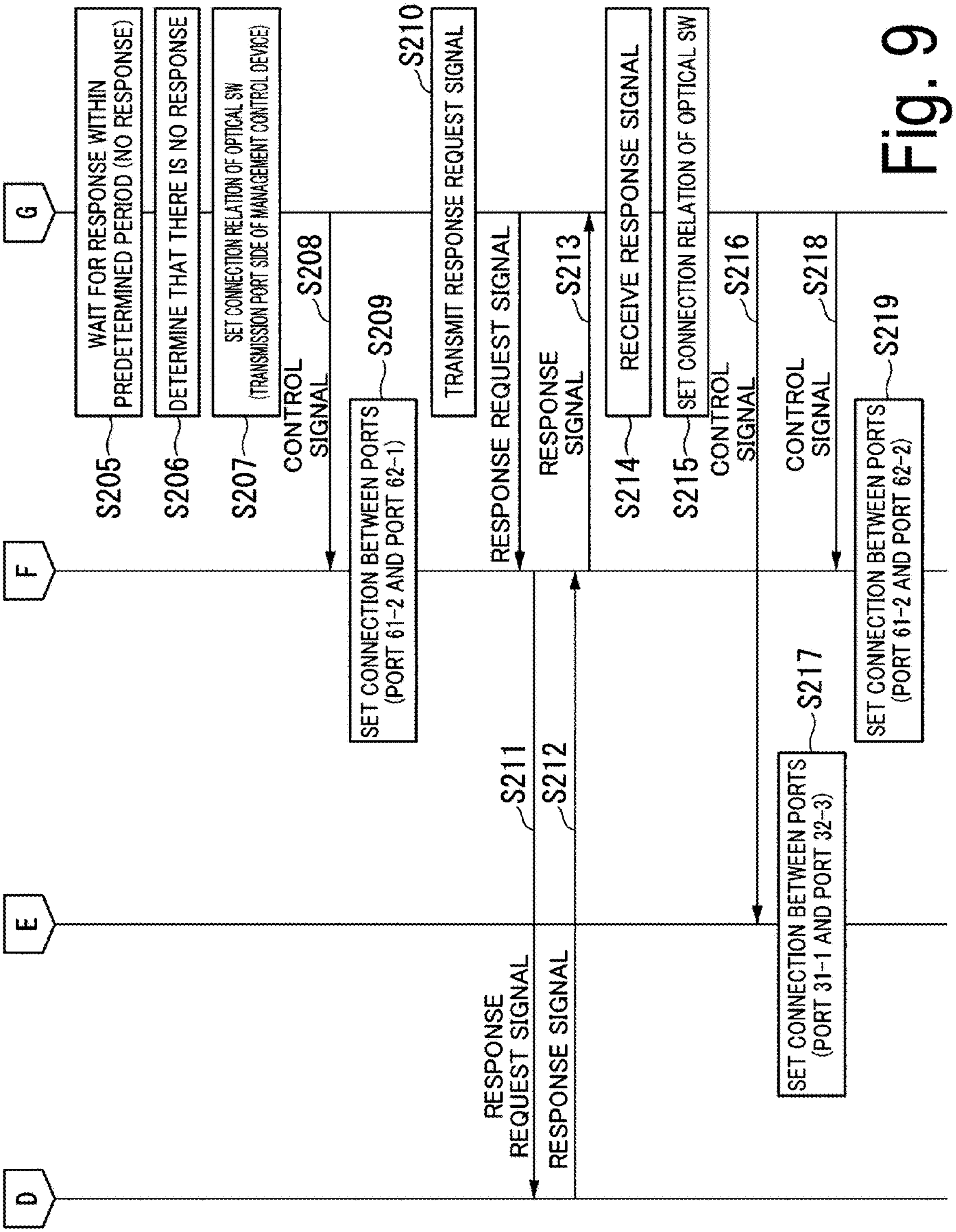
FIG. 9 is a sequence diagram showing the flow of processing of the optical communication system according to the second embodiment.

FIGS. 8 and 9 are sequence diagrams showing a flow of processing of the optical communication system 1*a* according to the second embodiment. It is assumed that the subscriber device 10 is not connected to the optical SW 30 and the optical SW 60 when the processing of FIGS. 8 and 9 is started. In addition, in FIGS. 8 and 9, the same processing as that in FIGS. 3 and 4 will be denoted by the same reference numerals as those in FIGS. 3 and 4, and the description thereof will be omitted.

By executing the processing from step S101 to the step S107, the port 31-1 of the optical SW 30 is connected to the port 32-1. As a result, the optical signal transmitted from the subscriber device 10 is transmitted to the reception port of the management control device 20.

Next, the optical SW control unit 21*a* refers to the grouping information stored in the storage unit 23*a* and specifies other ports 31 grouped with the port 31-1 to which the optical signal is input. For example, the optical SW control unit 21 specifies the ports 31-2 to 31-4 and the ports 61-1 and 61-2 of the optical SW 60 as the other ports 31. The optical SW control unit 21*a* selects one port 31 or 61 out of the specified ports 31-2 to 31-4 and the ports 61-1 and 61-2 of the optical SW 60.

However, since the transmission port of the management control device 20*a* is connected to the port 62 of the optical SW 60, the optical SW control unit 21*a* selects one port 61 out of the ports 61-1 and 61-2 of the optical SW 60. For example, the optical SW control unit 21*a* selects the port 61-1.

The optical SW control unit 21*a* sets the connection relation between the ports of the optical SW 60 on the basis of the selected port 61-1 (step S201). Specifically, the optical SW control unit 21*a* sets the connection relation of the optical SW 60 to connect the selected port 61-1 to the port 62-1 to which the transmission port of the management control device 20*a* is connected. The optical SW control unit 21*a* generates a control signal for connecting the port 61-1 to the port 62-1. The optical SW control unit 21*a* transmits the generated control signal to the optical SW 60 (step S202).

The optical SW 60 sets the connection relation between the ports on the basis of the control signal transmitted from the management control device 20*a* (step 203). Thus, the port 61-1 and the port 62-1 of the optical SW 60 are connected to each other. The subscriber device management control unit 22 generates a response request signal when the connection between the port 62-1 to which the transmission port of the management control device 20 is connected and any one port 61 is completed. The subscriber device management control unit 22 transmits the generated response request signal via the transmission port and the optical transmission line 46-5 (step S204).

The response request signal transmitted from the management control device 20*a* is input to the port 62-1 of the optical SW 60. The response request signal input to the port 62-1 is output from the port 61-1 connected to the port 62-1 by the optical SW 60. However, since the subscriber device 10 is not connected to the port 61-1, the response request signal output from the port 61-1 is not transferred to the subscriber device 10.

The subscriber device management control unit 22 waits for a response for a predetermined period from the time when the response request signal is transmitted (step S205). The subscriber device management control unit 22 executes processing of step S214 when the response to the response request signal is obtained within the predetermined period and executes processing of step S206 when no response to the response request signal is obtained within the predetermined period. Here, it is assumed that no response is obtained. The subscriber device management control unit 22 determines that there is no response to the response request signal (step S206).

When no response to the response request signal is obtained, the subscriber device management control unit 22 notifies the optical SW control unit 21*a* that no response is obtained. When the optical SW control unit 21*a* receives the notification from the subscriber device management control unit 22 that no response has been received, it again sets the connection relation between the ports of the optical SW 60 (step S207). In this case, the optical SW control unit 21*a* selects one port 61 except the already selected port 61 out of the ports 61-1 and 61-2 of the optical SW 60 specified by the processing of the step S201. For example, the optical SW control unit 21*a* selects the port 61-2.

The optical SW control unit 21*a* sets the connection relation of the optical SW 60 to connect the selected port 61-2 to the port 62-1 to which the transmission port of the management control device 20*a* is connected. The optical SW control unit 21*a* generates a control signal for connecting the port 61-2 to the port 62-1. The optical SW control unit 21*a* transmits the generated control signal to the optical SW 60 (step S208).

The optical SW 60 sets the connection relation between the ports on the basis of the control signal transmitted from the management control device 20*a* (step S209). Thus, the port 61-2 of the optical SW 60 is connected to the port 62-1. The subscriber device management control unit 22 generates a response request signal when the connection between the port 62-1 to which the management control device 20*a* is connected and any one port 61 is completed. The subscriber device management control unit 22 transmits the generated response request signal via the transmission port and the optical transmission line 46-5 (step S210). The subscriber device management control unit 22 waits for a response for a predetermined period from the time when the response request signal is transmitted, similarly to the processing of the step S205.

The response request signal transmitted from the management control device 20*a* is input to the port 62-1 of the optical SW 60. The response request signal input to the port 62-1 by the optical SW 60 is output from the port 61-2 connected to the port 62-1. Since the subscriber device 10 is connected to the port 61-2 via the optical transmission line 41-6, the response request signal output from the port 61-2 is transferred to the subscriber device 10 via the optical transmission line 41-6 (step S211).

The subscriber device 10 receives the response request signal transmitted from the management control device 20*a* at the reception port 12. The subscriber device 10 generates a response signal in accordance with the reception of the response request signal. The subscriber device 10 transmits the generated response signal from the transmission port 11 to the optical transmission line 41-1 (step S212). The response signal transmitted from the subscriber device 10 is input to the port 31-1 of the optical SW 30 via the optical transmission line 41-1.

Since the port 31-1 of the optical SW 30 is connected to the port 32-1, the response signal input to the port 31-1 is output from the port 32-1 (step S213). The response signal output from the port 32-1 is received at the reception port of the management control device 20*a* via the optical transmission line 46-1 (step S214).

By receiving the response signal within the predetermined period, the subscriber device management control unit 22 recognizes that the reception port 12 of the subscriber device 10 is connected to the port 61-2 of the optical SW 60. The subscriber device management control unit 22 associates information about the port 31-1 of the optical SW 30 to which the transmission port 11 of the subscriber device 10 is connected with information about the port 61-2 of the optical SW 60 to which the reception port 12 of the subscriber device 10 is connected, and stores them in the storage unit 23*a*. This information is stored as subscriber information. Thereafter, the subscriber device management control unit 22 allocates a wavelength used for transmission and reception to the subscriber device 10.

The optical SW control unit 21*a* refers to the subscriber information and sets the connection relation between the ports of the optical SW 30 and the optical SW 60 (step S215). Specifically, the optical SW control unit 21*a* sets the connection relation between the ports of the optical SW 30 and the optical SW 60 such that the optical signal input to the port 31-1 connected to the transmission port 11 of the subscriber device 10 reaches the port 32-3 of the optical SW 30 to which the reception port 16 of the subscriber device 15 serving as the communication partner is connected, and the optical signal input to the port 62-2 of the optical SW 60 to which the transmission port 17 of the subscriber device 15 is connected reaches the port 61-2 of the optical SW 60 connected to the reception port 12 of the subscriber device 10.

The optical SW control unit 21*a* generates a control signal for connecting the port 31-1 of the optical SW 30 to the port 32-3 of the optical SW 30. The optical SW control unit 21*a* transmits the generated control signal to the optical SW 30 (step S216). The optical SW 30 sets the connection relation between the ports to connect the port 31-1 to the port 32-3 on the basis of the control signal transmitted from the management control device 20*a* (step S217).

Further, the optical SW control unit 21*a* generates a control signal for connecting the port 61-2 of the optical SW 60 to the port 62-2 of the optical SW 60. The optical SW control unit 21*a* transmits the generated control signal to the optical SW 60 (step S218). The optical SW 60 sets the connection relation between the ports to connect the port 61-2 to the port 62-2 on the basis of the control signal transmitted from the management control device 20*a* (step S219).

According to the optical communication system 1*a* configured as described above, even in the optical communication system that performs two-core transmission in which the transmission port 11 and the reception port 12 of the newly connected subscriber device (for example, the subscriber device 10) are connected to different optical SWs and the optical transmission lines accommodated in the same optical cable are connected to a plurality of optical SWs, it is possible to open an optical path for communicatively connecting the newly connected subscriber device to the subscriber device serving as the communication partner.

Third Embodiment

In a third embodiment, a configuration in which a plurality of optical SWs are provided, a transmission port and a reception port of a newly connected subscriber device are connected to different optical SWs, and optical transmission lines accommodated in different optical cables are connected to the plurality of optical SWs will be described.

Figure 10:
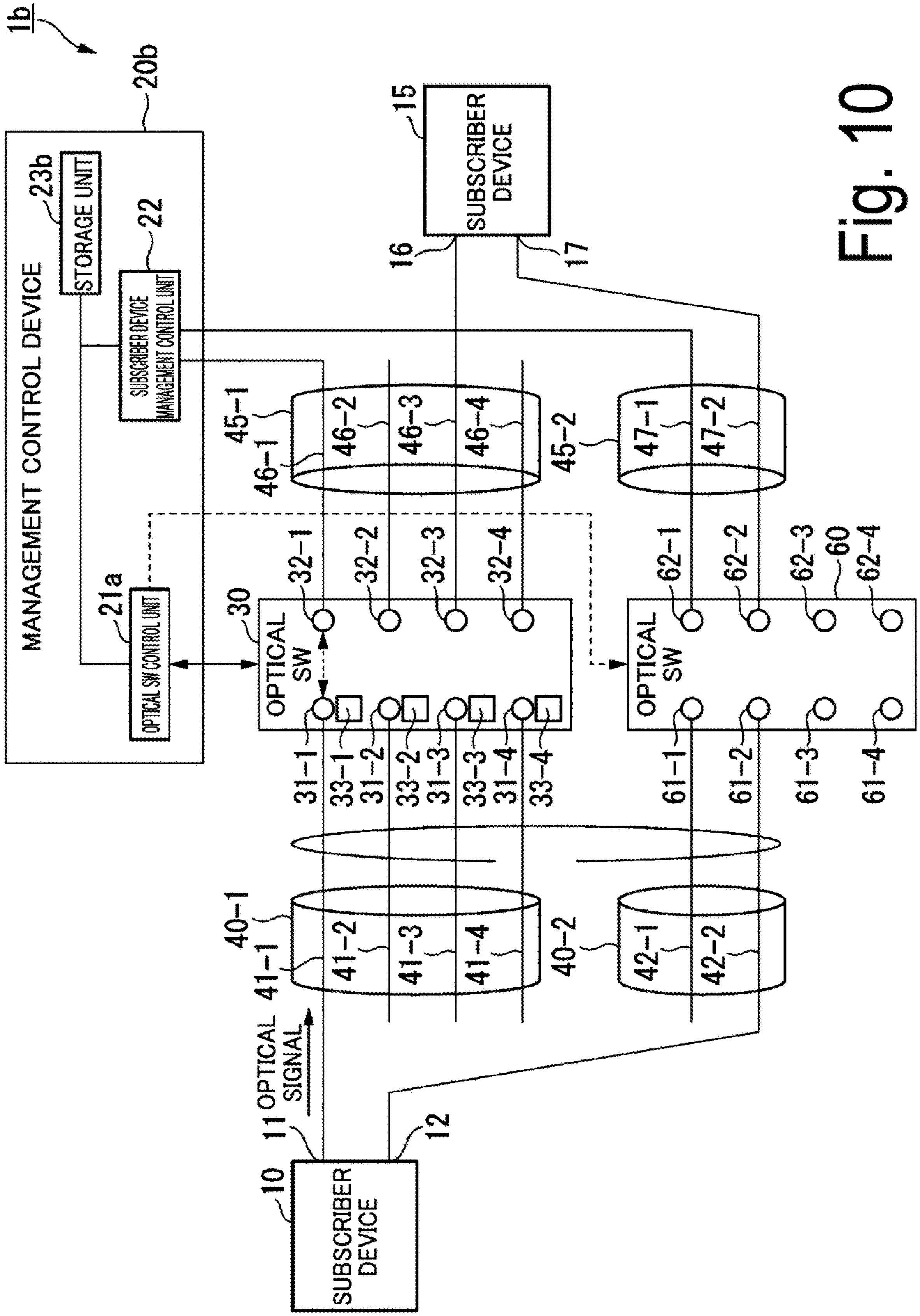
FIG. 10 is a diagram showing a configuration example of an optical communication system according to a third embodiment.

FIG. 10 is a diagram showing a configuration example of an optical communication system 1*b* according to the third embodiment. The optical communication system 1*b* includes the one or more subscriber devices 10, the one or more subscriber devices 15, a management control device 20*b*, the optical SW 30, and the optical SW 60. The optical communication system 1*b* is different from the second embodiment in that a plurality of optical cables 40-1 and 40-2 are provided between the subscriber device 10 and the optical SWs 30 and 60, and a pairing method is basically the same as the method described above.

In the third embodiment, the optical cable 40-1 is provided between the subscriber device 10 and the optical SW 30, the optical cable 40-2 is provided between the subscriber device 10 and the optical SW 60, an optical cable 45-1 is provided between the subscriber device 15 and the optical SW 30, and an optical cable 45-2 is provided between the subscriber device 15 and the optical SW 60. The optical cable 40-1 accommodates a plurality of optical transmission lines 41, the optical cable 40-2 accommodates a plurality of optical transmission lines 42, the optical cable 45-1 accommodates a plurality of optical transmission lines 46, and the optical cable 45-2 accommodates a plurality of optical transmission lines 47. In this way, in the third embodiment, a transmission port and a reception port of a subscriber device are connected to optical transmission lines accommodated in different optical cables.

In FIG. 10, the following connection relation is shown as an example. The transmission port 11 of the subscriber device 10 is connected to the port 31-1 of the optical SW 30 via the optical transmission line 41-1 accommodated in the optical cable 40-1, and the reception port 12 of the subscriber device 10 is connected to the port 61-2 of the optical SW 60 via the optical transmission line 42-2 accommodated in the optical cable 40-2. The reception port 16 of the subscriber device 15 is connected to the port 32-3 of the optical SW 30 via the optical transmission line 46-3 accommodated in the optical cable 45-1, and the transmission port 17 of the subscriber device 15 is connected to the port 62-2 of the optical SW 60 via an optical transmission line 47-2 accommodated in the optical cable 40-2. A reception port of the management control device 20 is connected to the port 32-1 of the optical SW 30 via the optical transmission line 46-1 accommodated in the optical cable 45-1, and a transmission port of the management control device 20 is connected to the port 62-1 of the optical SW 60 via an optical transmission line 47-1 accommodated in the optical cable 45-2.

The management control device 20*b* includes the optical SW control unit 21*a*, the subscriber device management control unit 22, and a storage unit 23*b*.

The storage unit 23*b* stores subscriber information, grouping information, and optical detection unit installation information. In the third embodiment, in the grouping information, it is assumed that grouping the ports 31 (for example, the ports 31-1 to 31-4) of the optical SW 30 to which the optical transmission lines 41 accommodated in the optical cable 40-1 are connected and the ports 61 (for example, the ports 61-1 and 61-2) of the optical SW 60 to which the optical transmission lines 42 accommodated in the optical cable 40-2 are connected as one group, and grouping the ports 32 (for example, the ports 32-1 to 32-4) of the optical SW 30 to which the optical transmission lines 46 accommodated in the optical cable 45-1 are connected and the ports 62 (for example, the ports 62-1 to 62-2) of the optical SW 60 accommodated in the optical cable 45-2 as one group have been determined.

In this way, in the third embodiment, even when optical transmission lines accommodated in different optical cables are connected to ports of different optical SWs, they can be classified into the same group in accordance with setting of the grouping information.

Figure 11:
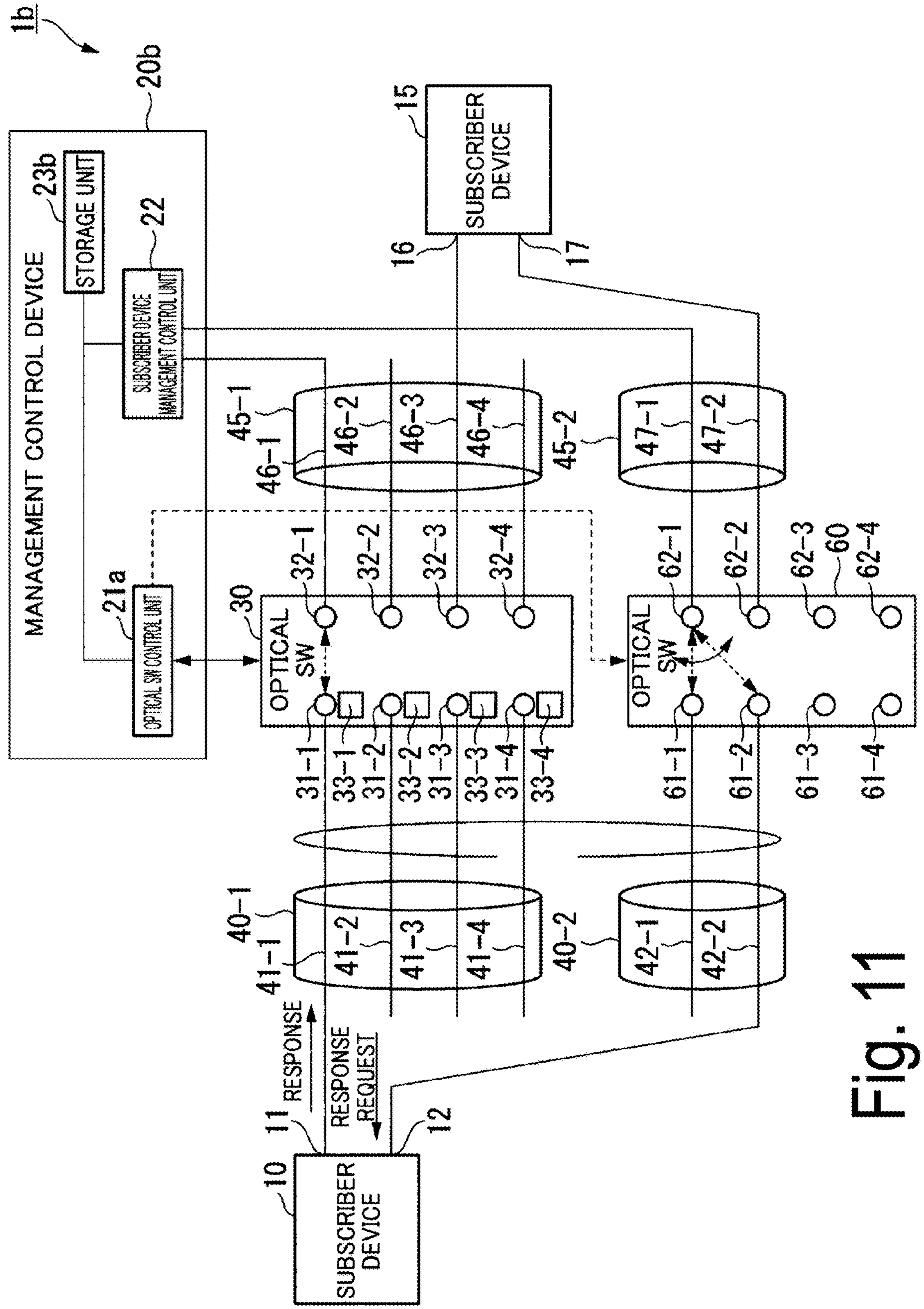
FIG. 11 is a diagram for explaining pairing processing of each port of each optical SW according to the third embodiment.

Next, a method for pairing ports of the optical SW 30 and the optical SW 60 connected to a newly connected subscriber device (for example, the subscriber device 10) via optical transmission lines performed by the management control device 20*b* according to the third embodiment will be described with reference to FIGS. 10 and 11. Also, in FIGS. 10 and 11, different points from the first embodiment will be described. FIG. 11 is a diagram for explaining pairing processing of each port of the optical SW 30 and the optical SW 60 according to the third embodiment. Here, it is assumed that the transmission port 11 of the subscriber device 10 is connected to the port 31-1 of the optical SW 30 via the optical transmission line 41-1, and the reception port 12 of the subscriber device 10 is connected to the port 61-2 of the optical SW 60 via the optical transmission line 42-2.

Since the processing related to the transmission port 11 of the subscriber device 10 is the same as in the first embodiment, the description thereof will be omitted. The management control device 20*b* refers to the grouping information stored in the storage unit 23*b* and specifies other ports grouped with the port 31-1 associated with the optical detection unit 33-1 that has detected the input of the optical signal. The optical SW control unit 21*b* of the management control device 20*b* switches the connection relation between the ports 31 of the optical SW 30 and the ports 32 of the optical SW 30 or the ports 61 of the optical SW 60 and the ports 62 of the optical SW 60 so that the specified other ports are sequentially connected to the transmission port of the management control device 20*b*.

In the example shown in FIG. 11, the other ports grouped with the port 31-1 are the ports 31-2 to 31-4 of the optical SW 30 and the ports 61-1 and 61-2 of the optical SW 60. However, since the transmission port of the management control device 20*b* is connected to the ports 62 of the optical SW 60, there is no need to switch the connection relation of the optical SW 30. Thus, the management control device 20*b* switches the connection relation between the ports 61 of the optical SW 60 and the ports 62 of the optical SW 60 to be sequentially connected to the transmission port of the management control device 20*b*.

Each time the transmission port of the management control device 20*b* is connected to the other ports 61 via the ports 62, the subscriber device management control unit 22 transmits a response request signal via the transmission port and the optical transmission line 47-1. When the management control device 20*b* receives a response signal within a receivable period of the response signal to the response request signal transmitted to the subscriber device 10 via the port 61-*p* of the optical SW 60, the management control device 20*b* can recognize that the reception port 12 of the subscriber device 10 transmitting the response signal is connected to the port 61-*p* of the optical SW 60. For example, when the management control device 20*b* receives the response signal within the receivable period of the response signal to the response request signal transmitted to the subscriber device 10 via the port 61-2 of the optical SW 60, the management control device 20*b* can recognize that the reception port 12 of the subscriber device 10 that has transmitted the response signal is connected to the port 61-2 of the optical SW 60.

Through the above procedure, the management control device 20*b* can recognize the port 31 of the optical SW 30 to which the transmission port 11 of the newly connected subscriber device 10 is connected and the port 61 of the optical SW 60 to which the reception port 12 of the subscriber device 10 is connected. The management control device 20*b* retains information regarding the combination of the port 31 of the optical SW 30 and the port 61 of the optical SW 60 that have been recognized.

Since the processing in the third embodiment is the same as the processing in the second embodiment except that the grouping information stored in the storage unit 23*b* is different, the description thereof will be omitted.

According to the optical communication system 1*b* configured as described above, even in the optical communication system that performs two-core transmission in which the transmission port 11 and the reception port 12 of the newly connected subscriber device (for example, the subscriber device 10) are connected to different optical SWs and optical transmission lines accommodated in different optical cables are connected to each optical SW, it is possible to open an optical path for communicatively connecting the newly connected subscriber device to the subscriber device serving as the communication partner.

Some functional units of the management control devices 20, 20*a*, and 20*b* according to the above-described embodiments may be realized by computers. In that case, these functions may be realized by recording programs for realizing these functions in a computer-readable recording medium, and causing the computer system to read and execute the programs recorded in the recording medium. Further, the "computer system" recited herein includes an operating system (OS) and hardware such as peripheral devices.

Also, the "computer-readable recording medium" indicates a storage device such as a portable medium such as a flexible disk, a magneto-optical disc, a read only memory (ROM) or a CD-ROM, or a hard disk built into a computer system. Further, the "computer-readable recording medium" may also include a recording medium that dynamically retains a program for a short period of time, such as a communication line used for transmitting the program via a network such as the Internet) or other communication lines such as a telephone line, and in that case, a recording medium that retains the program for a certain period of time, such as a volatile memory inside a computer system that serves as a server or client. In addition, the program described above may be for realizing some of the functions described above, may be capable of realizing the functions described above in combination with a program already recorded in a computer system, or may be implemented using a programmable logic device such as a field programmable gate array (FPGA).

Although the embodiments of the present invention have been described in detail with reference to the drawings above, specific configurations are not limited to these embodiments, and also include designs and the like within the scope not departing from the gist of the present invention.

Industrial Applicability

The present invention is applicable to an optical communication system including an optical switch.

REFERENCE SIGNS LIST

10, 15 Subscriber device
20, 20*a*, 20*b* Management control device
21, 21*a* Optical SW control unit
22 Subscriber device management control unit
23, 23*a*, 23*b* Storage unit
30, 60 Optical SW
40, 45 Optical cable
31, 31-1 to 31-4, 31-*m*, 61, 61-1 to 61-4, 61-*p* First port
32, 32-1 to 32-4, 32-*n*, 62, 62-1 to 62-4, 62-*q* Second port
33, 33-1 to 33-4, 33-*m* Optical detection unit

The invention claimed is:

1. An optical communication path opening method in an optical communication system that performs two-core transmission in which at least one newly connected subscriber device and one or more optical switches are connected to each other through a plurality of optical transmission lines and an upstream optical signal and a downstream optical signal are transmitted through different optical transmission lines, wherein the one or more optical switches include a plurality of first ports and a plurality of second ports, and a management control device performs the method, the method comprising:

switching connection such that other first ports grouped with a transmission port connected first port of the one or more optical switches connected to a transmission port of the one subscriber device are sequentially connected to one second port to which a response request signal is input, transmitting the response request signal to the one second port each time the connection is switched, specifying a reception port connected first port connected to a reception port of the one subscriber device in accordance with reception of a response signal in response to the response request signal, and setting a connection relation between the ports of the one or more optical switches such that an optical signal input to the transmission port connected first port reaches an optical transmission line to which a reception port of another subscriber device serving as a communication partner is connected and an optical signal transmitted from a transmission port of the another subscriber device reaches the reception port connected first port.

2. The method for opening an optical communication path according to claim 1, wherein an optical switch including the transmission port connected first port is provided with an optical detection unit configured to detect an optical signal input to the optical switch in association with the first port, and the management control device specifies the transmission port connected first port on the basis of the detection result of the optical detection unit.

3. The method for opening an optical communication path according to claim 1, wherein the management control device receives the response signal by switching the connection relation between the ports of the one or more optical switches to connect a second port of the one or more optical switches to which a reception port of the management control device is connected to the specified transmission port connected first port.

4. The method for opening an optical communication path according to claim 3, wherein the management control device switches connection such that second ports other than the second port of the one or more optical switches to which the reception port of the management control device is connected are sequentially connected to the other first ports.

5. The method for opening an optical communication path according to claim 1, wherein the one or more optical switches are one optical switch, optical transmission lines connected to each of the plurality of first ports of the one optical switch are accommodated in one optical cable, and the management control device switches connection such that other first ports connected to optical transmission lines other than an optical transmission line connected to the transmission port connected first port among the optical transmission lines accommodated in the one optical cable are sequentially connected to the one second port to which the response request signal is input.

6. The method for opening an optical communication path according to claim 1, wherein the one or more optical switches are a first optical switch and a second optical switch, at least some of optical transmission lines connected to each of the plurality of first ports of the first optical switch and at least some of optical transmission lines connected to each of the plurality of first ports of the second optical switch are accommodated in one optical cable, and the management control device switches connection such that other first ports connected to optical transmission lines other than an optical transmission line connected to the transmission port connected first port among the optical transmission lines accommodated in the one optical cable are sequentially connected to the one second port to which the response request signal is input.

7. The method for opening an optical communication path according to claim 1, wherein the one or more optical switches are a first optical switch and a second optical switch, at least some of optical transmission lines connected to each of the plurality of first ports of the first optical switch are accommodated in a first optical cable, and at least some of optical transmission lines connected to each of the plurality of first ports of the second optical switch are accommodated in a second optical cable, and the management control device switches connection such that other first ports connected to optical transmission lines other than an optical transmission line connected to the transmission port connected first port among the optical transmission accommodated in the second optical cable are sequentially connected to the one second port to which the response request signal is input.

8. A management control device provided in an optical communication system that performs two-core transmission in which at least one newly connected subscriber device and one or more optical switches are connected to each other through a plurality of optical transmission lines and an upstream optical signal and a downstream optical signal are transmitted through different optical transmission lines, the one or more optical switches including a plurality of first ports and a plurality of second ports, the management control device comprising:

an optical switch controller configured to switch connection such that other first ports grouped with a transmission port connected first port of the one or more optical switches connected to a transmission port of the one subscriber device are sequentially connected to one second port to which a response request signal is input; and a subscriber device management controller configured to transmit the response request signal to the one second port each time the connection is switched, wherein the subscriber device management controller specifies a reception port connected first port connected to a reception port of the one subscriber device in accordance with reception of a response signal in response to the response request signal, and the optical switch controller sets a connection relation between the ports of the one or more optical switches such that an optical signal input to the transmission port connected first port reaches an optical transmission line to which a reception port of another subscriber device serving as a communication partner is connected and an optical signal transmitted from a transmission port of the another subscriber device reaches the reception port connected first port.

* * * * *